(12) United States Patent
Ansari et al.

(10) Patent No.: US 11,367,927 B2
(45) Date of Patent: Jun. 21, 2022

(54) SEPARATOR FOR ENERGY STORAGE DEVICE

(71) Applicants: International Business Machines Corporation, Armonk, NY (US); Korea Research Institute of Chemical Technology, Daejeon (KR)

(72) Inventors: Younes Ansari, San Jose, CA (US); Young-Hye Na, San Jose, CA (US); Ho-Cheol Kim, San Jose, CA (US); Sogol Teschler, San Jose, CA (US); Yongku Kang, Daejeon (KR); Do Youb Kim, Daejeon (KR); Dong Wook Kim, Daejeon (KR); Jung Don Suk, Daejeon (KR)

(73) Assignees: International Business Machines Corporation, Armonk, NY (US); Korea Research Institute of Chemical Technology, Daejeon (KR)

( * ) Notice: Subject to any disclaimer, the term of this patent is extended or adjusted under 35 U.S.C. 154(b) by 93 days.

(21) Appl. No.: 15/979,186

(22) Filed: May 14, 2018

(65) Prior Publication Data

US 2019/0348658 A1    Nov. 14, 2019

(51) Int. Cl.
*H01M 2/16*    (2006.01)
*H01M 10/052*    (2010.01)
(Continued)

(52) U.S. Cl.
CPC ....... *H01M 50/449* (2021.01); *H01M 10/052* (2013.01); *H01M 12/08* (2013.01);
(Continued)

(58) Field of Classification Search
CPC ............. H01M 2/1686; H01M 2/1613; H01M 2/1646; H01M 2/166; H01M 2/164;
(Continued)

(56) References Cited

U.S. PATENT DOCUMENTS 7,070,632 B1    7/2006    Visco et al.
8,323,815 B2    12/2012   Beard
(Continued)

FOREIGN PATENT DOCUMENTS

CN    102742045 A    10/2012
CN    102969472 B    1/2015
(Continued)

OTHER PUBLICATIONS

"Alumina—Aluminium Oxide—Al2O3—A Refractory Ceramic Oxide," Azo Materials. (Year: 2020).*
(Continued)

*Primary Examiner* — Ula C Ruddock
*Assistant Examiner* — Matthew W Van Oudenaren
(74) *Attorney, Agent, or Firm* — Karen Canaan; CanaanLaw, P.C.

(57) ABSTRACT

An energy storage device includes an anode; a cathode; an electrolyte in contact with both the anode and the cathode; and an electrically non-conductive separator between the anode and the cathode. The separator includes a membrane having a plurality of voids, wherein at least some of the voids are partially filled with inorganic particles, and wherein the inorganic particles exhibit a shear modulus greater than the shear modulus of the membrane.

22 Claims, 17 Drawing Sheets

(51) Int. Cl.
  *H01M 12/08* (2006.01)
  *H01M 2/14* (2006.01)
  *H01M 50/449* (2021.01)
  *H01M 50/44* (2021.01)
  *H01M 50/403* (2021.01)
  *H01M 50/431* (2021.01)
  *H01M 50/446* (2021.01)
  *H01M 50/406* (2021.01)
  *H01M 50/443* (2021.01)
  *H01M 50/489* (2021.01)

(52) U.S. Cl.
  CPC ....... *H01M 50/403* (2021.01); *H01M 50/431* (2021.01); *H01M 50/44* (2021.01); *H01M 50/446* (2021.01); *H01M 50/406* (2021.01); *H01M 50/443* (2021.01); *H01M 50/489* (2021.01)

(58) Field of Classification Search
  CPC .............. H01M 50/403; H01M 50/406; H01M 50/431; H01M 50/434; H01M 50/437; H01M 50/489; H01M 50/491; H01M 50/494; H01M 50/497; H01M 50/44; H01M 50/449; H01M 12/08; H01M 50/451; H01M 50/454; H01M 50/457
  See application file for complete search history.

(56) References Cited

U.S. PATENT DOCUMENTS

| | | | |
|---|---|---|---|
| 8,999,602 B2 | 4/2015 | Gronwald et al. | |
| 2005/0175894 A1* | 8/2005 | Visco | H01M 4/13 429/212 |
| 2005/0208383 A1* | 9/2005 | Totsuka | H01M 2/162 429/247 |
| 2007/0117007 A1* | 5/2007 | Visco | H01M 2/1646 429/144 |
| 2007/0264577 A1* | 11/2007 | Katayama | H01M 2/162 429/246 |
| 2009/0155676 A1* | 6/2009 | Zhamu | H01M 50/46 429/129 |
| 2010/0206804 A1* | 8/2010 | Weber | H01M 50/44 210/500.21 |
| 2011/0053001 A1* | 3/2011 | Babic | C04B 35/486 429/322 |
| 2012/0310698 A1 | 11/2012 | Rhee et al. | |
| 2014/0178774 A1* | 6/2014 | Kim | H01M 12/08 429/405 |
| 2016/0141576 A1 | 5/2016 | Lee et al. | |
| 2017/0012264 A1 | 1/2017 | Carlson et al. | |
| 2017/0288281 A1 | 10/2017 | Chiang et al. | |

FOREIGN PATENT DOCUMENTS

| | | |
|---|---|---|
| CN | 104584267 A | 4/2015 |
| CN | 105098125 B | 7/2017 |
| EP | 1146576 A1 | 3/2001 |

OTHER PUBLICATIONS

"Silica—Silicon Dioxide (SiO2)," Azo Materials. (Year: 2020).*
"Goodfellow Polyvinyl Fluoride (PVF) Film," MatWeb Material Property Data. (Year: 2020).*
"Overview of materials for Polyethylene Terephthalate (PET), Unreinforced," MatWeb Material Property Data. (Year: 2020).*
"Polyethylene terephthalate," D2 Designerdata. (Year: 2020).*
"Supplier Data—Lithium (Li) (Goodfellow)" (Year: 2020).*
"Reinforce" definition, Dictionary.com, 2021. (Year: 2021).*
E-Glass Fibre,: Azo Materials. (Year: 2021).*
Han et al., "Over-limiting Current and Control of Dendritic Growth by Surface Conduction in Nanopores", Retrieved from https://arxiv.org/ftp/arxiv/papers/1408/1408.4202.pdf on Nov. 13, 2017, 22 pgs.
Aetukuri et al., Flexible Ion-Conducting Composite Membranes for Lithium Batteries, Advanced Energy Materials 1500265:1-6 (2015).
Ansari et al., Low-Cost, Dendrite-Blocking Polymer-Sb2O3 Separators for Lithium and Sodium Batteries, Journal of the Electrochemical Society 161(10):A1655-A1661 (2014).
Bi et al., Investigating dendrites and side reactions in sodium-oxygen batteries for improved cycle lives, Chemical Communications 51:7665-7668 (2015).
Park et al., New battery strategies with a polymer/Al2O3 separator, Journal of Power Sources 263:52-58 (2014).

* cited by examiner

SEPARATOR FOR ENERGY STORAGE DEVICE

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency, thereby permitting use of batteries as power sources for additional applications.

The need for high specific capacities and specific energies has led to the study of various metallic anodes, such as, for example, lithium, sodium, and/or magnesium anodes. Such metallic anodes may improve energy storage capability compared to conventional lithium-ion batteries that employ lithium intercalating graphitic anodes. The use of metallic anodes may also provide a relatively high specific energy in metal-sulfur batteries, metal-air batteries, metal-oxygen batteries, metal-carbon dioxide batteries, and batteries including metal with other gas mixtures including oxygen. For example, a lithium-oxygen battery could potentially have a theoretical specific energy three to five times greater than conventional lithium ion batteries.

An energy storage device with a metallic anode may also include an electrically non-conductive separator between the metallic anode and a cathode, which forces electrons through an external electrical circuit to which the battery is connected such that the electrons do not travel through the battery, while still enabling metal ions to flow through the battery during charge and discharge.

SUMMARY

The present disclosure describes energy storage devices including a mechanically reinforced separator made from a membrane with a plurality of voids, wherein at least some of the voids are at least partially filled with inorganic particles. The inorganic particles may reduce, or even substantially prevent, the formation of dendrites (e.g., needle-like metallic crystals) on a metallic anode and/or on a cathode material of the energy storage device.

The mechanically reinforced separator may reduce migration of oxidation products, cathode materials, or both, through the separator, and can enhance the useful life, improve cyclability, or improve the energy density of the energy storage device. Incorporation of the mechanically reinforced separator into an energy storage device such as a battery may reduce or substantially prevent the formation of dendrites, prevent dendrites from penetrating through the separator, and/or control the migration of oxidation products and/or cathode materials within the energy storage device. The mechanically reinforced separator may be manufactured easily at relatively low cost.

In one example, the present disclosure is directed to an energy storage device including an anode; a cathode; an electrolyte in contact with both the anode and the cathode; and an electrically non-conductive separator between the anode and the cathode. The separator includes a membrane having a plurality of voids, wherein at least some of the voids are partially filled with inorganic particles, and wherein the inorganic particles exhibit a shear modulus greater than the shear modulus of the membrane.

In another example, the present disclosure is directed to an energy storage device including an anode; a cathode; an electrolyte in contact with both the anode and the cathode; and an electrically non-conductive separator between the anode and the cathode. The separator includes a membrane having a plurality of voids, wherein at least 50% of the total volume of the voids is filled with inorganic particles.

In yet another example, the present disclosure is directed to a method of forming an energy storage device, which includes depositing inorganic particles within the voids of an electrically non-conductive membrane, wherein at least 50% of the total volume of the voids is filled with inorganic particles, and wherein the inorganic particles have a shear modulus greater than the shear modulus of the membrane; placing the membrane between an anode and a cathode; and adding an electrolyte between the anode and the cathode, thereby forming the energy storage device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
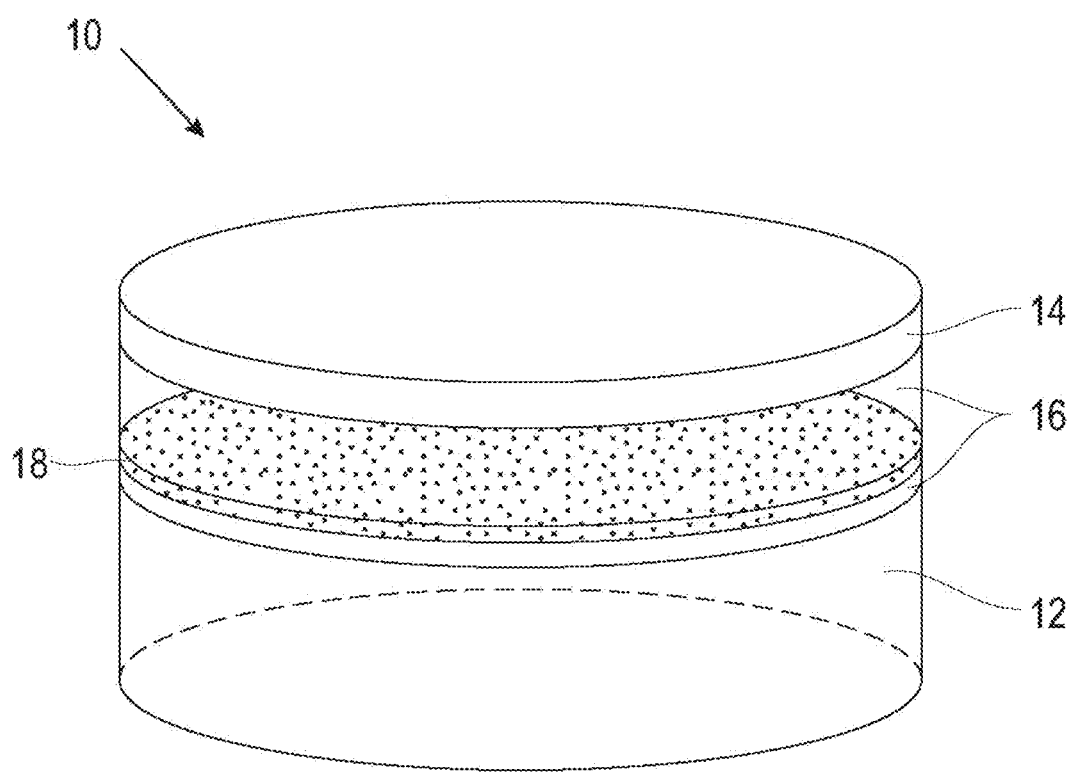
FIG. 1 is a conceptual diagram illustrating an example battery including an anode, an electrolyte, a cathode material, and a separator.

FIG. 1 is a conceptual diagram illustrating a battery 10 including an anode 12, an electrolyte 16, a cathode material 14, and a separator 18. In some embodiments, the battery 10 operates via reduction-oxidation (redox) reactions, and utilizes different oxidation states and redox reactions of one or more components or elements for charge and discharge cycles.

The anode 12 may be a metallic material including, but not limited to, lithium, sodium, or magnesium. In some embodiments, the anode 12 consists essentially of elemental lithium, sodium, or magnesium, or lithium, sodium, or magnesium alloyed with one or more additional elements. In examples in which battery 10 operates via redox reactions, the metal of anode 12 (e.g., lithium, sodium, or magnesium) may be oxidized at anode 12 and reduced at cathode material 14 to induce the flow of electrons.

In some examples, the cathode material 14 may include a material of suitable electrical conductivity that collects electrons generated by a redox reaction during discharge of battery 10 and provides a conductive path to an external electrical circuit to which battery 10 is connected. Similarly, during recharge of battery 10, cathode material 14 may provide an electrical pathway between an external voltage source and electrolyte 16 to supply voltage for another redox reaction to charge battery 10. In some cases, cathode material 14 may include a current collector material such as an electrically conductive powder like a metal and/or carbon powder, woven or non-woven metal fibers, metal foam, woven or non-woven carbon fibers, or the like. In some embodiments, the cathode material 14 may include stainless-steel mesh, aluminum (Al) mesh, nickel (Ni) foam, copper (Cu), and/or carbon paper. For example, the cathode material 14 may include a stainless-steel mesh with carbon nanoparticles deposited thereon.

In some embodiments, the cathode material 14 may include or be in contact with a source of oxygen or another gas mixture including oxygen. For example, the battery 10 may be a metal-oxygen battery, a metal-carbon dioxide battery, or a battery including metal with other gas mixtures including oxygen, in which the cathode material 14 may include or be in contact with oxygen, air, carbon dioxide, or another gas mixture including oxygen. In some examples, the source of oxygen and/or cathode material 14 may also include a catalyst. For example, the source of oxygen and/or cathode material 14 may include a transition metal oxide, such as manganese oxide ($MnO_2$), chromium (III) oxide ($Cr_2O_3$), cobalt (II, III) oxide ($Co_3O_4$), and/or ruthenium (IV) oxide ($RuO_2$).

In some embodiments the cathode 14 may include sulfur. For example, cathode material 14 may include a current collector material with sulfur particles deposited thereon, or sulfur-coated carbon nanotubes. As another example, cathode material 14 may include a sulfur-containing cathode material including a redox-mediator. In some examples, the redox-mediator may include birnessite (δ-$MnO_2$), titanium dioxide ($TiO_2$), zirconium dioxide ($ZrO_2$), or combinations thereof.

In some embodiments, the cathode material 14 may be selected from materials suitable for use in a Li-ion battery such as, for example, lithium cobalt oxide (LCO, e.g., $LiCoO_2$), nickel cobalt aluminum (NCA, e.g., $LiNi_xCo_y$-$Al_zO_2$, $LiNi_{0.8}Co_{0.15}Al_{0.05}O_2$), lithium ion manganese oxide (LMO, e.g., $LiMn_2O_4$), lithium nickel manganese cobalt oxide (NMC, e.g., $LiNiMnCoO_2$), nickel cobalt manganese (NCM, e.g., $LiNi_xCo_yMn_zO_2$, $LiNi0_{.33}Co_{0.33}Mn_{0.33}O_2$), lithium iron phosphate (LFP, e.g., $LiFePO_4$), and mixtures and combinations thereof.

The battery 10 includes an electrolyte 16 between anode 12 and cathode material 14. Suitable electrolytes 16 may include a salt and a solvent and/or diluent. In some examples, a salt may include, but is not limited to, sodium trifluoromethanesulfonate (NaTf), lithium bis(trifluoromethylsulphonyl)imide (LiTFSI), lithium hexafluorophosphate ($LiPF_6$), lithium trifluoromethanesulfonate ($LiCF_3SO_3$), lithium bistrifluoromethylsulfonyl imide (Li($CF_3SO_2$)$_2$N), lithium nitrate ($LiNO_3$), lithium hydroxide (LiOH), lithium chloride (LiCl), lithium bromide (LiBr), lithium fluoride (LiF), lithium perchloride ($LiClO_4$), lithium tetrafluoroborate ($LiBF_4$), lithium oxalyldifluoroborate (LiODFB), lithium bis(oxalato)borate (LiBOB), and mixtures and combinations thereof. Electrolyte 16 may additionally, or alternatively, include salts of sodium similar to those listed above for lithium.

In some examples, electrolyte 16 may also include one or more diluents. For example, electrolyte 16 may additionally include 1,2-dimethoxyethane (DME), diethyl sulfite, ethylene sulfites, ethyl methyl carbonate (EMC), fluorinated carbonates (e.g., fluoroethylene carbonate (FEC)), methyl acetate (MA), dimethyl sulfoxide (DMSO), ionic liquids (ILs), ethylene carbonate (EC), propylene carbonate (PC), dimethyl carbonate (DMC), diethyl carbonate (DEC), ethyl propyl ether (EPE), tetrahydrofuran (THF), 1,3-dioxolane (DOL), dimethyldiglycol (diglyme), triethylene glycol dimethyl ether (triglyme), tetra(ethylene glycol)dimethyl ether (TEGDME), adiponitrile, sulfones (e.g., allyl methyl sulfone), ethyl sulfite, phenylcyclohexane, vinylene carbonate, dimethylacetamide (DMA), n-methyl-2-pyrrolidone (NMP), diethyldiglycole (DEDG), acetonitrile (ACN), dimethyl formamide (DMF), ethylene glycol (EG), triethyl amine (TEA), ethyl acetate, and mixtures and combinations thereof.

The separator 18 is constructed of an electrically non-conductive material and resides between anode 12 and cathode material 14, and controls movement of electrons through battery 10 such that the electrons move through an external circuit to which battery 10 is connected. The separator 18 is a membrane including a plurality of voids, and at least some of the voids in the membrane are at least partially filled with inorganic particles.

Figure 2:
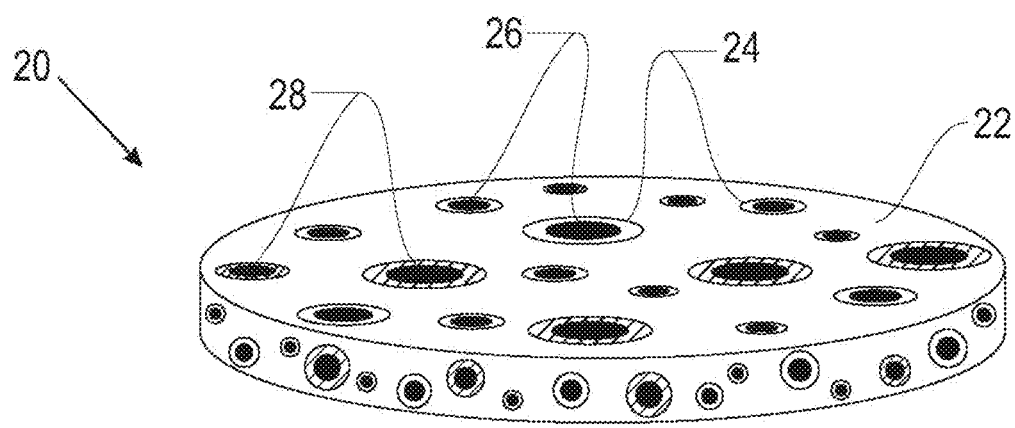
FIG. 2 is an enlarged view of an example separator including a membrane that includes a plurality of voids and a plurality of inorganic particles within at least some voids of the plurality of voids.

FIG. 2 is an enlarged view of an example separator 20 including a membrane 22 with a plurality of voids 24, and inorganic particles 26 within at least some voids 24. The membrane 22 is made from an electrically non-conductive material, and suitable examples include, but are not limited to, a polymer, an inorganic material, an organic-inorganic hybrid material, and combinations thereof. In some examples, the membrane 22 may include a glass microfiber or an epoxy-based polymeric material. The membrane 22 may be any suitable size and/or shape. In some examples, the thickness of the membrane 22 may be between about 0.1 μm and about 500 μm, between about 0.1 μm and about 200 μm, between about 0.1 μm and about 100 μm, or between about 0.1 μm and about 20 μm.

The membrane 22 includes a plurality of voids 24. In the embodiment of FIG. 2, the voids 24 have different sizes, but substantially the same shape. However, the voids 24 may be substantially uniform in size and shape, or may have substantially the same size and different shape. The voids 24 may be any suitable regular or irregular shape, and examples of cross-sectional shapes include regular or irregular circles, squares, hexagons, ellipses, and the like.

In some embodiments, each void 24 defines an average characteristic dimension such as, for example, a cross-section dimension, of about 1 nanometer and about 100 microns, about 1 nanometer and about 50 microns, or about 1 nanometer and about 20 microns. In some embodiments, the average characteristic dimension of the voids 24 should be made larger and the passages through the separator 20 made less tortuous, which can make the separator 20 easier and/or less time consuming to manufacture.

The material of membrane 22 may include the voids 24 (e.g., the plurality of voids 24 need not be formed in membrane 22). For example, membrane 22 may include a commercially available membrane including the plurality of voids 24 and may be reinforced with inorganic particles 26 as described herein. In this way, the techniques described herein enable commercially available membranes to be reinforced with inorganic particles 26 to reduce or prevent dendrite formation, dendrite penetration through the separator, and/or migration of oxidation products and/or cathode materials through the separator.

In other examples, the voids 24 may be formed in membrane 22 using any suitable technique such as, for example, a track-etch process, phase inversion, extrusion, a sacrificial pore generator process, or the like.

At least some of the voids 24 of the membrane 22 include inorganic particles 26 therein, and are referred to herein as "reinforced." In the embodiment shown in FIG. 2, each void 24 includes a single inorganic particle 26 (e.g., there is a 1 to 1 ratio of voids 24 to inorganic particles 26). In some embodiments, one or more voids 24 may include more than one inorganic particle 26. An example separator in which some voids each include a plurality of inorganic particles will be described below in FIG. 3.

In some embodiments, for example, each void 24 including one or more inorganic particles 26 may be between about 50% and about 100% filled by the one or more inorganic particles 26. For example, each void 24 including one or more inorganic particles 26 may be between about 80% and 100% filled by the one or more inorganic particles 26. The inorganic particles 26 may be any suitable shape or size. In some embodiments, the size and/or shape of the single inorganic particle 26 may substantially correspond to the size and/or shape of the respective void 24 containing the single inorganic particle 26, although such an arrangement is not required.

The voids 24 may be filled with the inorganic particles 26 using any suitable technique. In some non-limiting examples, the membrane 22 may be immersed in a solution including the plurality of inorganic particles 26, the plurality of voids 24 may be sprinkled with the plurality of inorganic particles 26, or the like.

In some embodiments, the inorganic particles 26 include silica ($SiO_2$), alumina ($Al_2O_3$), a zeolite, a metal, a metal oxide, and mixtures and combinations thereof. For example, the inorganic particles 26 may include $Li_7La_3Zr_2O_{12}$ (LLZO), β-alumina, antimony oxide, LISICON (Lithium Ion Super Ionic Conductor), NASICON (Sodium Super Ionic Conductor), $xLi_2S-yP_2S_5$ (e.g., where x and y are integers; LPS), or combinations thereof.

The inorganic particles 26 may be selected from electrically non-conductive and ionically non-conductive materials, or electrically non-conductive and ionically conductive materials. In some non-limiting examples, the inorganic particles 26 may be ion-conducting particles, such as lithium ion-conducting particles like LLZO, sodium ion-conducting particles such as sodium β-aluminum, magnesium ion-conducting particles, and mixtures and combinations thereof. In some embodiments, an energy storage device including separator 20 with ion-conducting inorganic particles 26 may have improved cyclability, capacity, efficiency, or the like in comparison to an energy storage device including a separator 20 with ionically non-conductive inorganic particles.

In some examples, the inorganic particles 26 have a shear modulus greater than the shear modulus of an anode of the energy storage device including the separator 20. For example, the plurality of inorganic particles 26 may have a shear modulus greater than about 1 GPa, greater than about 3.3 GPa, greater than about 4.2 GPa, or greater than about 17 GPa. In various embodiments, the inorganic particles 26 may have a shear modulus greater than about 4.2 GPa for use in an energy storage device including a lithium anode, the inorganic particles 26 may have a shear modulus greater than about 3.3 GPa for use in an energy storage device including a sodium anode, or the inorganic particles 26 may have a shear modulus greater than about 17 GPa for use in an energy storage device including a magnesium anode. In some embodiments, the inorganic particles 26 may have a shear modulus greater than the shear modulus of membrane 22. In some cases, inorganic particles 26 with a shear modulus greater than the shear modulus of the anode of the energy storage device and/or greater than the shear modulus exhibited by membrane 22 may better suppress dendrite formation on the anode and/or reduce penetration of dendrites through separator 20.

The inorganic particles 24 within at least some voids 24 of the reinforced membrane 22 may decrease the effective size of each void 24, and the decreased effective size of each void 24 may reduce, or even substantially prevent, the formation of dendrites (e.g., needle-like metallic crystals) on a metallic anode and/or on a cathode of an energy storage device. In some cases in which dendrites have formed on an anode or a cathode, the presence of inorganic particles 26 within at least some voids 24 may help prevent the dendrites from penetrating through separator 20, which can short-circuit the energy storage device. The presence of inorganic particles 26 within at least some voids 24 may reduce migration of oxidation products, cathode materials, or both, through separator 20, which may thereby increase the useful life, improve cyclability, and improve the energy density of the energy storage device including separator 20. In some examples, between about 80% and about 99.9% of the voids 24 may include one or more inorganic particles 26, which reduces the number of voids 24 with larger effective sizes, and may further reduce formation and/or penetration of dendrites, migration of oxidation products and/or cathode materials through separator 20.

In some cases, separator 20 may optionally include a binder 28 selected to adhere the inorganic particles 26 to the interior walls within the voids 24, or to regions of the separator 20 proximal the voids 24. In various embodiments, the binder 28 may include an electrochemically stable (e.g., electrochemically non-conductive) polymeric material, such as, for example, carboxymethyl cellulose (CMC), styrene butadiene rubber (SBR), polyvinylidene fluoride (PVDF), polytetrafluoroethylene (PTFE), polyethylene glycol (PEG), polyethylene oxide (PEO), sodium alginate, polyvinylpyrrolidone (PVP), polyvinyl alcohol (PVA), and combinations thereof. In some examples, binder 28 may reduce or substantially prevent the one or more inorganic particles 26 from being expelled from a respective void 24 of the plurality of voids 24 including the one or more inorganic particles 26, which may increase the useful life of separator 20.

Figure 3:
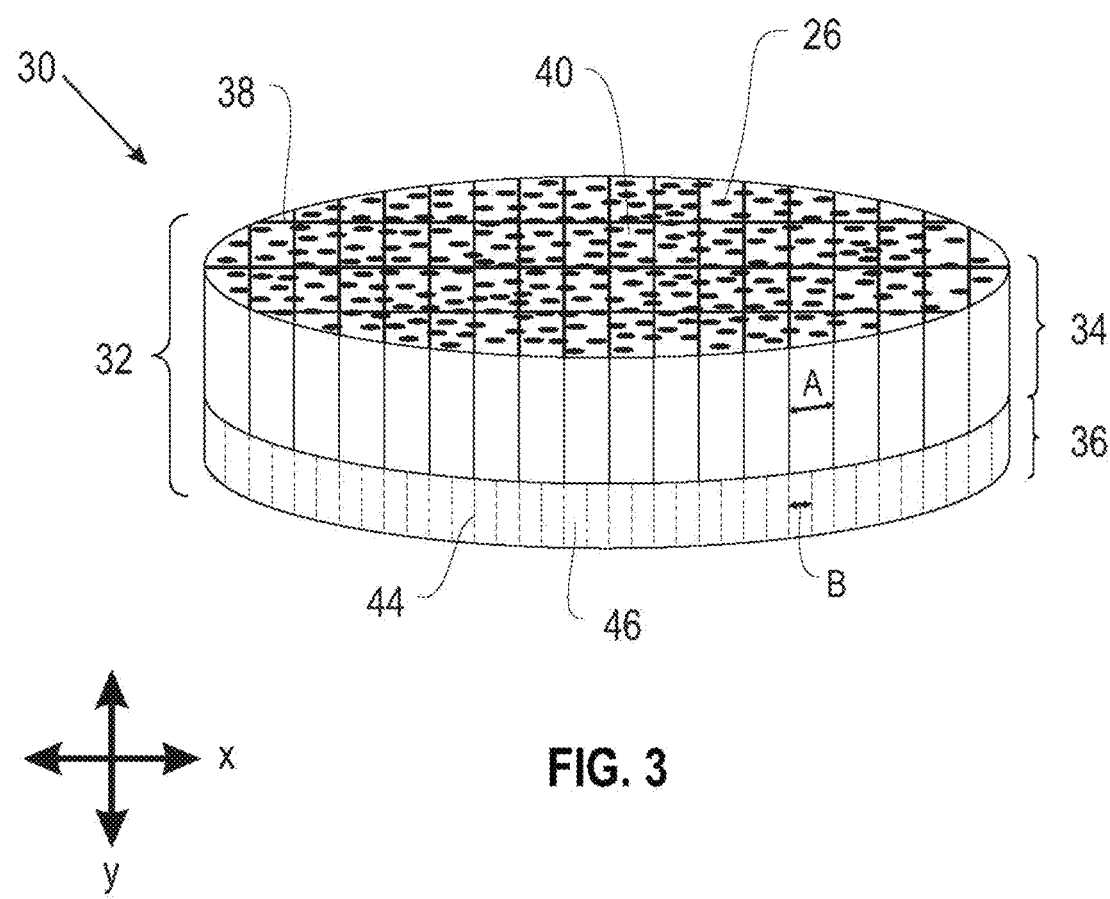
FIG. 3 is an enlarged view of an example separator including a membrane including a first layer and a second layer that each include a plurality of voids and a plurality of inorganic particles within at least some voids of the plurality of voids.

FIG. 3 is an enlarged view of another embodiment of a separator 30 including a membrane 32 with a first layer 34 and a second layer 36. The first layer 34 in FIG. 3 is thicker (e.g., in the direction of the y-axis of the example of FIG. 3) than second layer 36, but the layers 34, 36 may have any relative thickness, or may be the same thickness. Membrane 32 may include any material, size, and/or shape as described above with respect to membrane 22 of FIG. 2.

First layer 34 may include a first plurality of voids 40, and second layer 36 may include a second plurality of voids 46. In some examples, first plurality of voids 40 have a first average characteristic dimension and second plurality of voids 46 may have a second average characteristic dimension different than the first average characteristic dimension. In the example of FIG. 3, the first plurality of voids 40 includes a plurality of channels formed by channel walls 38 of first layer 34. The second plurality of voids 46 includes a plurality of pores formed by pore walls 44 of second layer 36. In the example of FIG. 3, each void 40 (e.g., each channel of the plurality of channels of first layer 34) has a larger cross-sectional dimension A than the cross-sectional dimension B of each void 46 (e.g., each pore of the plurality of pores of second layer 36).

In some examples, the first plurality of voids 40 of the first layer 34 may define a first pattern of voids and the second plurality of voids 46 of the second layer may define a second pattern of voids. The first pattern of voids and the second pattern of voids may be the same or different, and the voids in the first plurality of voids 40 and the second plurality of voids 46 may have different sizes, shapes and patterns. In some examples, at least one of the first pattern of voids and the second pattern of voids includes a regular pattern of voids. In some such examples, the metal plating and/or stripping of an energy storage device including separator 30 having a regular pattern of voids in at least one of first layer 34 and second layer 36 may be more homogeneous, which may improve the cyclic efficiency of the energy storage device.

At least some voids 40, 46 of the first plurality of voids and/or the second plurality of voids may include one or more inorganic particles 26. In the example of FIG. 3, each void 40 of the first plurality of voids 40 includes a plurality of inorganic particles 26, and the second plurality of voids 46 does not include the inorganic particles 26. In other examples, at least some of the voids 40 and at least some of the voids 46 may include one or more inorganic particles 26, or at least one void 46 may include one or more inorganic particles 26, while the plurality of voids 40 does not include any inorganic particles 26.

In any case, as described above, inorganic particles 26 may be any suitable size and/or shape. Moreover, each void 40, 46 may include any number of inorganic particles. In some examples, one or more voids 40, 46 may not include one or more inorganic particles. In some cases, between about 80% and about 99.9% of the first plurality of voids 40 and/or the second plurality of voids 40 may include one or more inorganic particles 26. Additionally, or alternatively, each void 40, 46 including one or more inorganic particles 26 may be between about 50% and about 100% or between about 80% and about 100% filled by the one or more inorganic particles 26.

The one or more inorganic particles 26 within at least some voids 40, 46 may decrease the effective size of each void, which may reduce, or even substantially prevent, the formation of dendrites on a metallic anode and/or on a cathode of an energy storage device, prevent dendrites from penetrating through separator 30, reduce migration of oxidation products, cathode materials, or both, through separator 30. The reduction of formation and/or penetration of dendrites and the reduction of migration of oxidation products and/or cathode materials may increase the useful life, improve the cyclability, or improve the energy density of the energy storage device including separator 30.

In some examples, separator 30 may include a binder selected to adhere or otherwise maintain the plurality of inorganic particles 26 within the at least some voids 40, 46. As described with respect to FIG. 2, the binder may be chosen from an electrochemically stable (e.g., electrochemically non-conductive) polymeric material, such as, for example, carboxymethyl cellulose (CMC), styrene butadiene rubber (SBR), polyvinylidene fluoride (PVDF), polytetrafluoroethylene (PTFE), polyethylene glycol (PEG), polyethylene oxide (PEO), sodium alginate, polyvinylpyrrolidone (PVP), polyvinyl alcohol (PVA), and combinations thereof.

Figure 4:
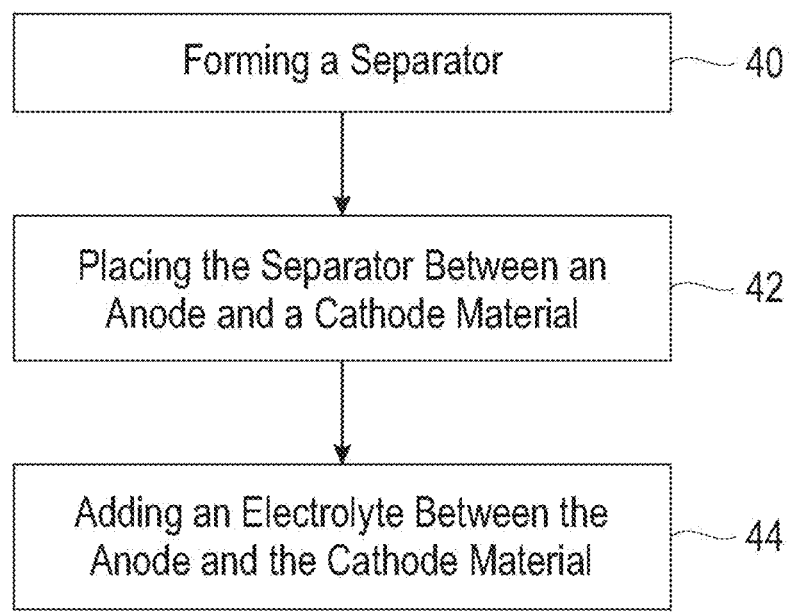
FIG. 4 is a flow diagram illustrating an example technique of forming an energy storage device including a separator as described herein.

FIG. 4 is a flow diagram illustrating an example technique of forming an energy storage device including a separator as described herein. The procedure of FIG. 4 will be described with respect to battery 10 of FIG. 1 and separator 20 of FIG. 2, but is not so limited. The technique of FIG. 4 includes forming separator 20 (40). In some examples, forming separator 20 may include forming membrane 22 including a plurality of voids 24. For example, the plurality of voids 24 may be formed in membrane 22 using a track-etch process, phase inversion, extrusion, a sacrificial pore generator process, or the like. In other examples, a material that forms membrane 22 may include the plurality of voids 24 such that the plurality of voids 24 need not be formed in membrane 22. For example, membrane 22 may be a commercially available membrane that is reinforced with the one or more inorganic particles 26. Membrane 22 may include a polymer, an inorganic material, an organic-inorganic hybrid material, and combinations thereof, and each void 24 may define an average cross-sectional length between about 1 nanometer and about 100 microns.

Forming separator 20 (40) includes depositing one or more inorganic particles 26 within at least some voids 24. For example, one or more inorganic particles 26, such as silica ($SiO_2$), alumina ($Al_2O_3$), a zeolite, a metal, a metal oxide, and combinations thereof, may be deposited within at least some voids 24. Any suitable technique may be used to deposit the one or more inorganic particles 26 within at least some voids 24. For example, membrane 22 may be immersed in a solution including the one or more inorganic particles 26. In some examples, the solution may include the one or more inorganic particles 26, the optional binder 28, and a solvent, such as water. Membrane 22 may be immersed in the solution multiple times until the solution absorption into voids 24 becomes negligible. Separator 20 may then be dried to remove the solvent. In some cases, separator 20 may be polished to remove any residual inorganic particles 26 (e.g., any inorganic particles 26 not within a void 24). Separator 20 may be further dried under a vacuum for about 24 hours.

Additionally, or alternatively, the one or more inorganic particles 26 may be sprinkled into voids 24. In such examples, membrane 22 may be gently wiped to remove any residual inorganic particles 26 (e.g., any inorganic particles 26 not within a void 24). In other examples, the one or more inorganic particles 26 can be sprayed into voids 24, dropcasted into voids 24 using a particle contacting solution, deposited in voids 24 using an application of pressure, infused into voids 24, or another suitable technique.

In some cases, between about 80% and about 99.9% of the voids 24 may include one or more inorganic particles 26. In some examples, the at least some voids 24 that include the one or more inorganic particles 26 may be between about 50% and about 100% filled by the one or more inorganic particles 26. The presence of the one or more inorganic particles in the voids 24 of the separator 20 decreases the effective sizes of the at least some voids 24, which may reduce formation and/or penetration of dendrites, migration of oxidation products and/or cathode materials through separator 20, or both. In some examples, both membrane 22 and the plurality of inorganic particles 26 may be electrically non-conductive to prohibit or prevent movement of electrons through battery 10, and the electrons instead move through an external circuit to which battery 10 is connected.

The technique of FIG. 4 further includes placing separator 20 between anode 12 and cathode material 14 (42) (e.g., as seen in FIG. 1 including separator 18, where separator 20 may be an example of separator 18 of FIG. 1). The technique additionally includes adding electrolyte 16 between anode 12 and cathode material 14 (44). In some examples, adding electrolyte 16 between anode 12 and cathode material 14 may include soaking separator 20 with electrolyte 16, dispensing electrolyte 16 between anode 12 and cathode material 14, wetting a surface of anode 12, cathode material 14, and/or separator 14 with electrolyte 16, or the like.

In other examples, forming an energy storage device may include additional and/or alternative steps. As one example, forming an energy storage device may include placing anode 12 in a battery cell, wetting a surface of anode 12 with electrolyte 16, placing separator 20 on anode 12, wetting a surface of separator 20 with electrolyte 16, placing cathode material 14 on separator 20, optionally wetting a surface of cathode material 14 with electrolyte 16, and sealing the battery cell. In other examples, a different technique may be used to form an energy storage device including separator 20 as described herein.

The present disclosure will now be described with respect to the following non-limiting examples.

EXAMPLES

Example 1

Na—$O_2$ Battery Cell Fabrication

Na—$O_2$ battery cell fabrication began with preparing Na foil from a Na rod (available from Sigma-Aldrich of St. Louis, Mo.) in an argon-filled glovebox with concentrations of $H_2O$ and $O_2$ less than about 1 ppm. The Na foil was formed by rolling the Na rod between two Celgard 2500 sheets (available from Celgard of Charlotte, N.C.). The Na foil was then punched into discs with 10 mm diameters to make an anode for the battery cell. A separator was placed in between the Na foil disc and a layer of AvCarb P50 carbon paper (available from FuelCellsEtc of College Station, Tex.) as a cathode material. A layer of Celgard 2500 was placed between the separator and the anode to help prevent reactions between the anode and the separator. About 100 µl of electrolyte including 1 M NaTf in DME was added dropwise on the cathode material, anode, and separator. A stainless-steel mesh with a diameter of 12 mm and a thickness of 0.1 mm and a stainless-steel ring spacer with a thickness of 0.5 mm was placed on top of the cathode material to act as a void space for the oxygen source. Inlet and outlet capillaries of the cell were sealed, and the cell was taken out of the glovebox. Afterwards, the cell was connected to a differential electrochemical mass spectrometer (DEMS) and the oxygen pressure was set to 1150 mbar. The battery cell was rested for 3 hours prior to performing electrochemical testing.

Example 2

Separator Including Glass Microfiber Membrane Reinforced by Alumina Particles

An infusion process was used to fabricate a separator including a glass microfiber membrane with a thickness of 125 µm including a plurality of voids with at least some voids of the plurality of voids including one or more inorganic particles. The inorganic particles used for this separator were alumina particles. The alumina particles were ionically non-conductive. The infusion process included immersing the glass microfiber membrane into a solution of sodium-alginate binder in water (about 5 mg/ml) containing a suspension of high modulus alumina (about 2 grams per ml solution). After the immersion in the solution, the separator was dried at about 120° C. for about 15 minutes to remove the water. The infusion process was repeated 5 times until the solution absorption into the voids of membrane remained negligible. Any residual large alumina particles were gently removed from the surface of the separator by polishing. The separator was dried at about 120° C. under a vacuum for another 24 hours after the polishing.

Figure 5:
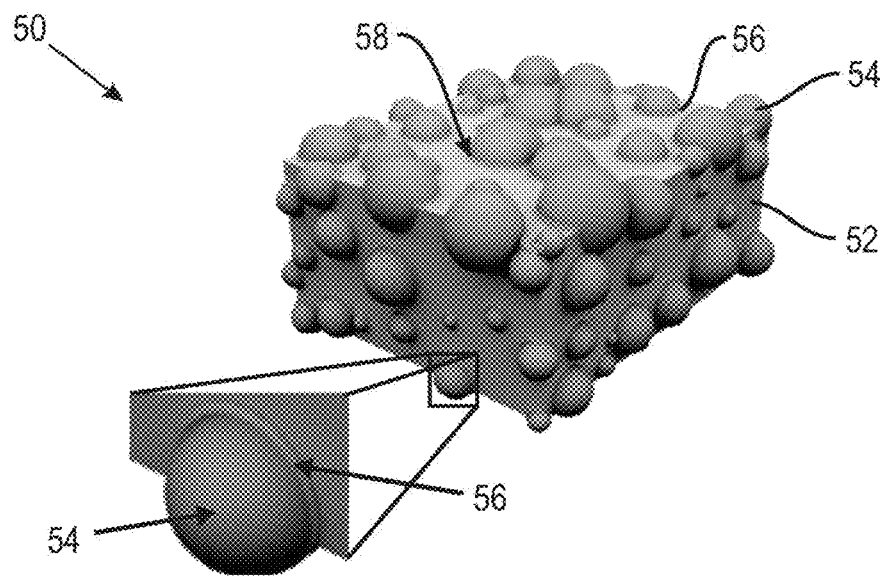
FIG. 5 is a schematic diagram illustrating an example separator including a glass microfiber membrane reinforced by alumina particles.

FIG. 5 is a schematic diagram illustrating an example separator 50 including the glass microfiber membrane 52 reinforced by the alumina particles 54 (e.g., alumina particles 54 within at least some voids 58 of the plurality of voids 58 of glass fiber membrane 52). Separator 50 also includes the sodium-alginate binder 56 to bind the alumina particles 54 with the at least some voids 58 of the plurality of voids 58 of membrane 52.

Figure 6:
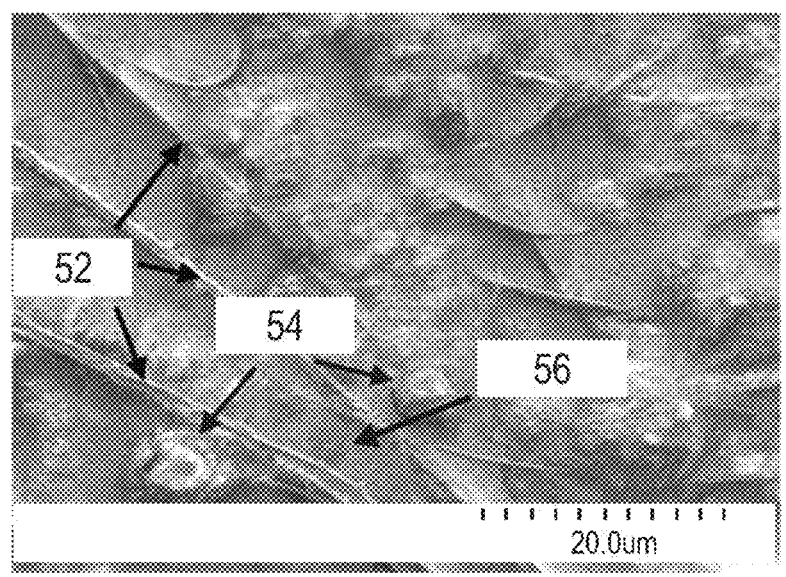
FIG. 6 is a scanning electron microscope (SEM) image of a top view of separator including a glass microfiber membrane reinforced by alumina particles and including a sodium-alginate binder.

FIG. 6 is a scanning electron microscope (SEM) image of a top view of separator 50 including the glass microfiber membrane 52 reinforced by the alumina particles 54 and the sodium-alginate binder 56.

A Na—$O_2$ battery cell was fabricated according the method of Example 1 with the separator including the glass microfiber membrane reinforced by the alumina particles and the sodium-alginate binder.

Figure 7:
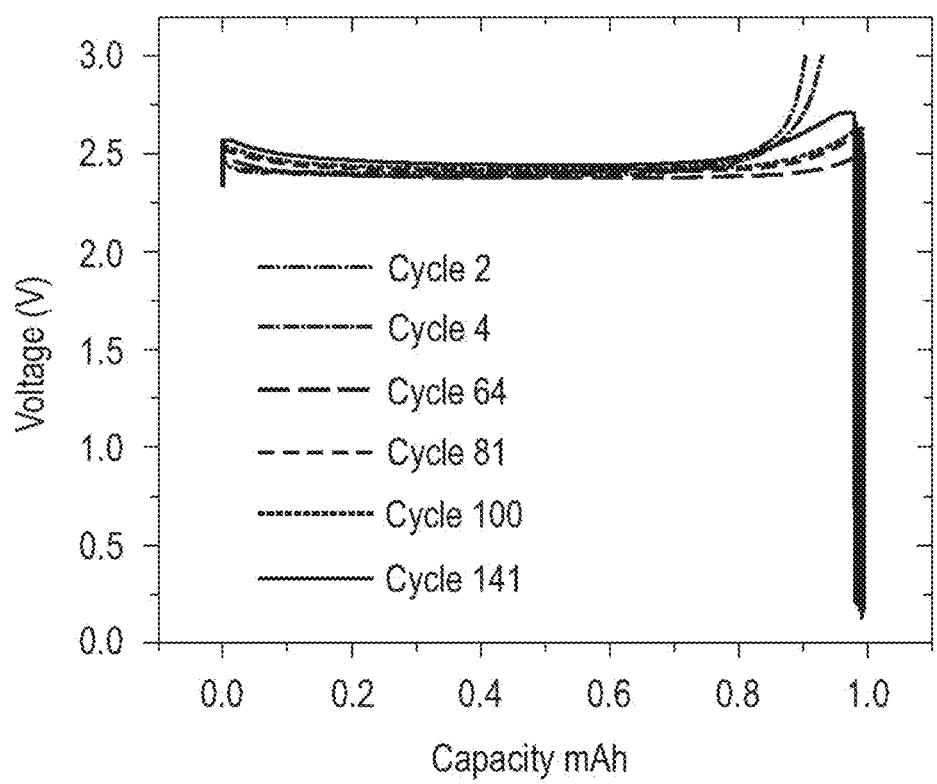
FIG. 7 is a graph illustrating a recharge voltage profile of a Na—$O_2$ battery cell including a separator including a glass microfiber membrane reinforced by alumina particles and including a sodium-alginate binder under a current density of about 280 $\mu A\ cm^{-2}$.

FIG. 7 is a graph illustrating a recharge voltage profile of the Na—$O_2$ battery cell including the separator including the glass microfiber membrane reinforced by alumina particles and including the sodium-alginate binder under a current density of about 280 μA $cm^{-2}$. As seen in FIG. 7, the Na—$O_2$ battery cell including the separator including the glass microfiber membrane reinforced by alumina particles and including the sodium-alginate binder was able to complete 141 cycles prior to exhibiting signs of an internal short circuit.

Example 3

Separator Including Glass Microfiber Membrane Reinforced by Sodium-β-Alumina Particles A separator including a glass microfiber membrane reinforced by sodium-β-alumina particles and including the sodium-alginate binder was formed using a technique similar to that of Example 2. The sodium-β-alumina particles were ionically conductive with respect to sodium ions. A Na—$O_2$ battery cell was fabricated according the method of Example 1.

Figure 8:
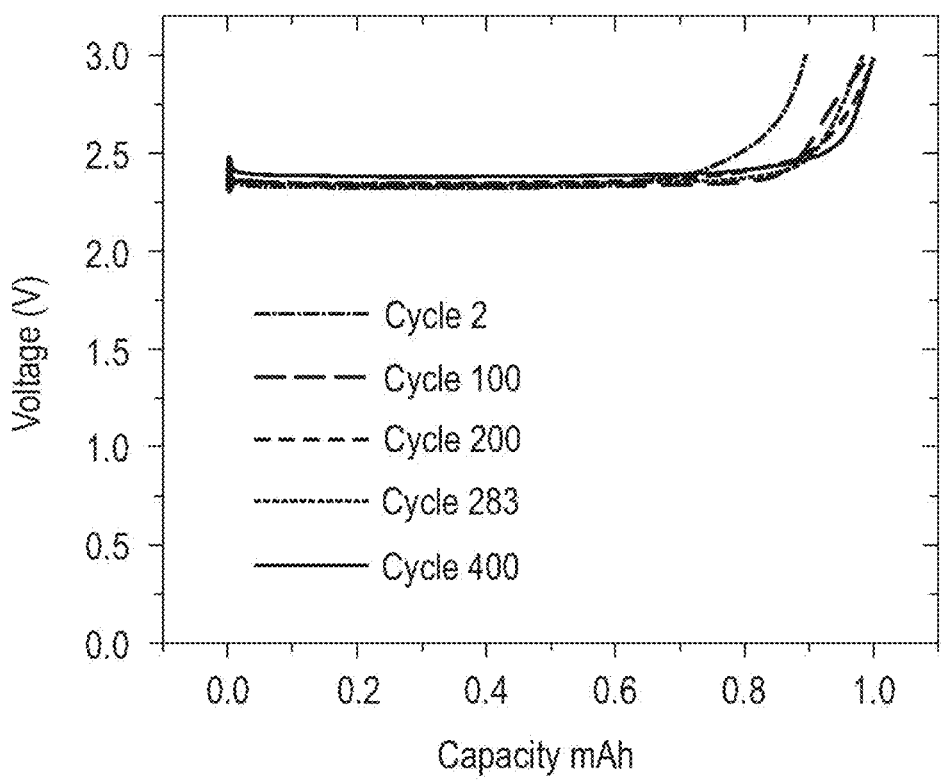
FIG. 8 is a graph illustrating a recharge voltage profile of a Na—$O_2$ battery cell including a separator including a glass microfiber membrane reinforced by sodium-$\beta$-alumina particles and including a sodium-alginate binder under a current density of about 280 $\mu A\ cm^{-2}$.

FIG. 8 is a graph illustrating a recharge voltage profile of the Na—$O_2$ battery cell including the glass microfiber membrane separator reinforced by sodium-β-alumina particles and the sodium-alginate binder under a current density of about 280 μA $cm^{-2}$. As seen in FIG. 8, the Na—$O_2$ battery cell did not exhibit any signs of an internal short circuit over 424 cycles (e.g., greater than about 2100 hours of cycle time). FIG. 8 shows that the Na—$O_2$ battery cell lost some capacity after about 424 cycles, which was likely due to a loss of the electrolyte from a nominal leakage of the battery cell.

In some examples, inorganic particles including ion-conductive inorganic particles may better suppress dendrite formation, penetration of dendrites through the separator, or both, in comparison to a separator including ionically non-conductive inorganic particles.

Comparative Example 1

Separator Including Glass Microfiber Membrane (Non-Reinforced)

A Na—$O_2$ battery cell was fabricated according the method of Example 1 with a separator including a glass microfiber membrane. The Na—$O_2$ battery cell of this example did not include the Celgard 2500 layer as described with respect to Example 1. The separator did not include any inorganic particles as described herein, and thus was not reinforced.

Figure 9:
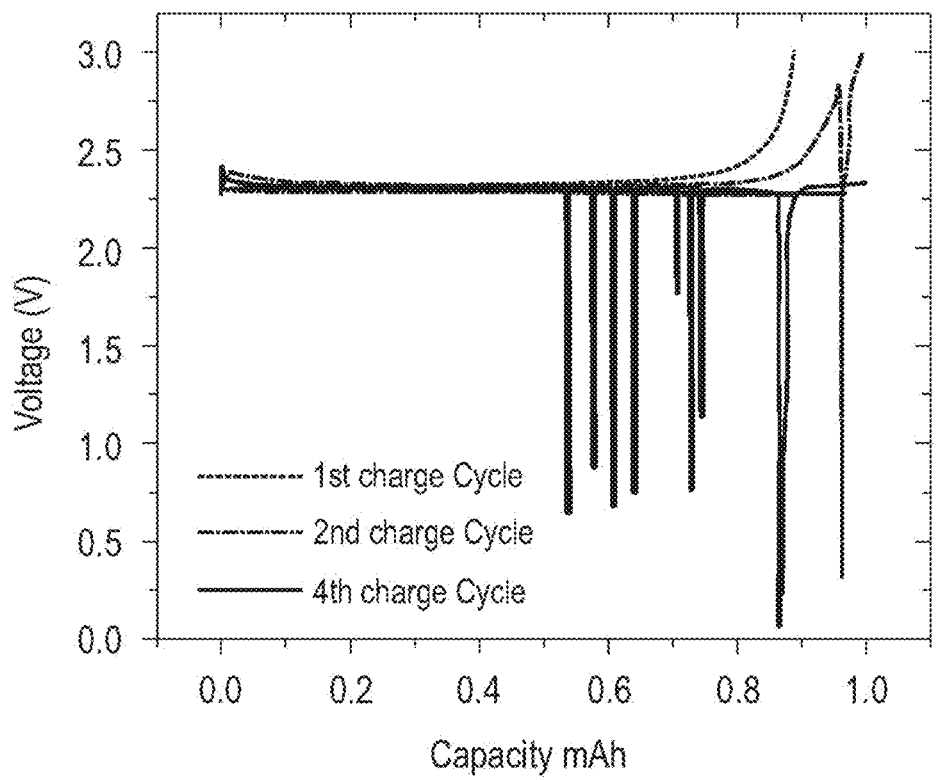
FIG. 9 is a graph illustrating a recharge voltage profile of a Na—$O_2$ battery cell including a separator including a non-reinforced glass microfiber membrane under a current density of about 280 $\mu A\ cm^{-2}$.

FIG. 9 is a graph illustrating a recharge voltage profile of the Na—$O_2$ battery cell including the separator including the non-reinforced glass microfiber membrane under a current density of about 280 μA $cm^{-2}$. As seen in FIG. 9, the Na—$O_2$ battery cell including the separator including the non-reinforced glass microfiber membrane exhibited signs of an internal short circuit after only 2 recharge cycles. The internal short circuit may be due to formation and/or penetration of dendrites through the non-reinforced separator. In comparison to the reinforced separators of Examples 2 and 3, the non-reinforced separator resulted in an internal short circuit significantly earlier than the separator reinforced by ionically non-conductive particles (Example 2). The separator reinforced by ionically conductive particles (Example 3) did not exhibit signs of an internal short circuit.

Another Na—$O_2$ battery cell was fabricated according the method of Example 1 with a separator including a glass microfiber membrane. In this example, a layer of Celgard 2500 was included in the battery call. The separator did not include any inorganic particles as described herein, and thus was not reinforced.

Figure 10:
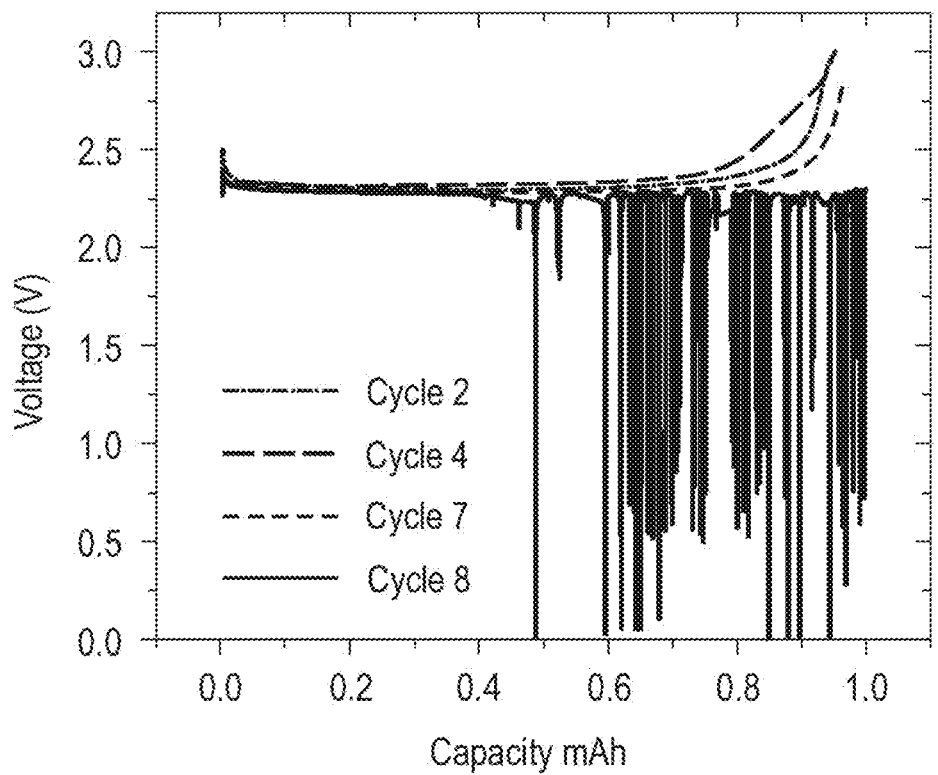
FIG. 10 is a graph illustrating a recharge voltage profile of a Na—$O_2$ battery cell including a separator including a non-reinforced glass microfiber membrane and a layer of Celgard 2500 under a current density of about 280 $\mu A\ cm^{-2}$.

FIG. 10 is a graph illustrating a recharge voltage profile of the Na—$O_2$ battery cell including the separator including the non-reinforced glass microfiber membrane and the layer of Celgard 2500 under a current density of about 280 μA $cm^{-2}$. As seen in FIG. 10, the Na—$O_2$ battery cell including the separator including the non-reinforced glass microfiber membrane exhibited signs of an internal short circuit after about 7 recharge cycles. The layer of Celgard 2500 improved the stability of the battery including the non-reinforced separator, however, the battery cell including the non-reinforced separator and the layer of Celgard 2500 still resulted in an internal short circuit significantly earlier than the separator reinforced by ionically non-conductive particles (Example 2).

Figure 11A:
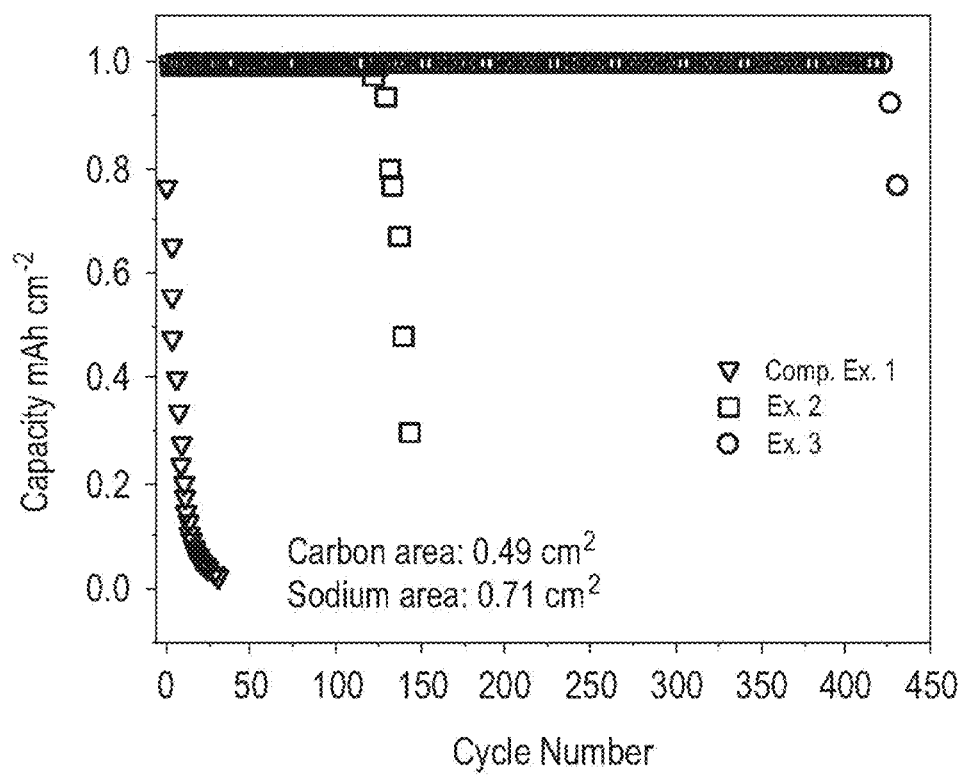
FIG. 11A is a comparative graph illustrating the cyclability of a battery cell including the separator of Example 2, a battery cell including the separator of Example 3, and a battery cell including the separator of Comparative Example 1 (with a layer of Celgard 2500).

FIG. 11A is a comparative graph illustrating the cyclability of the battery cell including the separator of Example 2, the battery cell including the separator of Example 3, and the battery cell including the separator of Comparative Example 1 (with the layer of Celgard 2500). The battery cells were discharged and recharged to 1 mAh $cm^{-2}$ at a current density of about 280 μA $cm^{-2}$. The battery cell including the separator of Example 2 was cycled 142 times, the battery cell including the separator of Example 3 was cycled 424 times, and the battery cell including the separator of Comparative Example 1 was cycled 9 times. The battery cells were cycled until about 80% of the initial capacity of the cell was lost. As seen in FIG. 11A, both of the battery cells including the separators of Example 2 and Example 3 exhibited improved cyclability over the battery cell including the separator of Comparative Example 1. Moreover, FIG. 11A illustrates that the battery cell including the separator of Example 3 (including the ionically conductive inorganic particles) exhibited improved cycling performance over the battery cell including the separator of Example 2 (including the ionically non-conductive inorganic particles). Thus, in some examples, a separator including a plurality of inorganic particles that are ionically conductive may exhibit improved electrochemical performance in comparison to a separator including a plurality of inorganic particles that are ionically non-conductive.

Figure 11B:
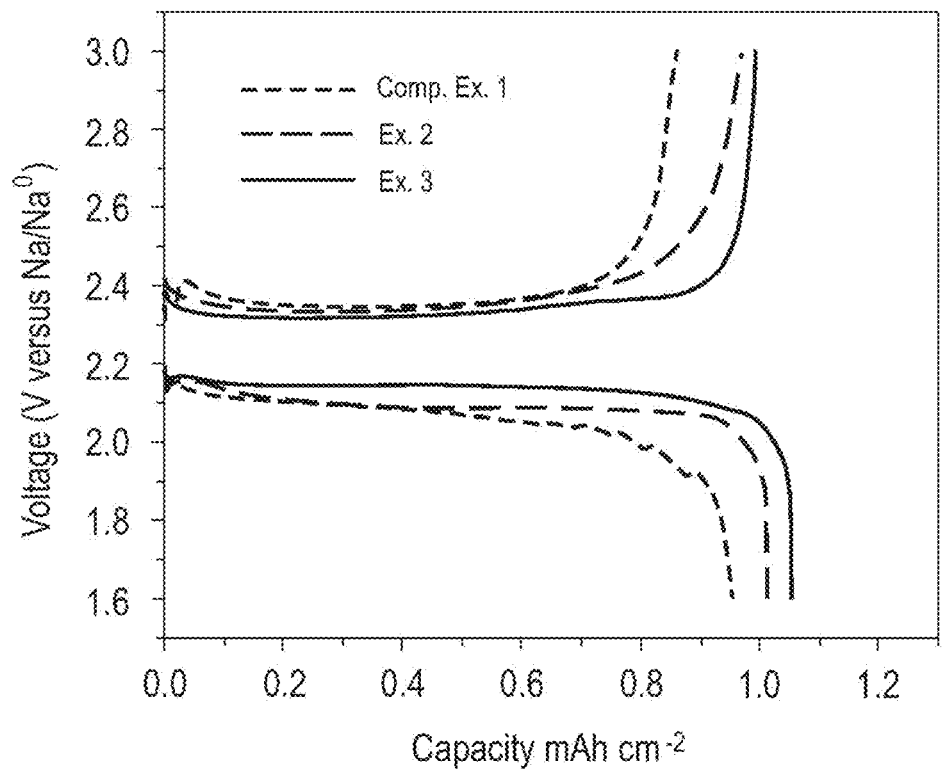
FIG. 11B is a comparative graph illustrating full discharge and recharge profiles of a battery cell including the separator of Example 2, a battery cell including the separator of Example 3, and a battery cell including the separator of Comparative Example 1 (with a layer of Celgard 2500).

FIG. 11B is a comparative graph illustrating full discharge and recharge profiles of the battery cell including the separator of Example 2, the battery cell including the separator of Example 3, and the battery cell including the separator of Comparative Example 1 (with the layer of Celgard 2500). The battery cells were discharged to a cut-off voltage of about 1.6 V versus Na+/Na$^0$ and recharged to a voltage of about 3.0 V versus Na+/Na$^0$ at a current density of about 280 $\mu$A cm$^{-2}$. About 0.1 mm thick sodium discs from a sodium foil was used in all three battery cells, as the overall capacity of the battery cells may be limited by the amount of sodium metal loading in the cell. The initial oxygen pressure in all battery cells was set to 1150 mbar and the battery cells were rested for 6 hours after oxygenation (prior to cycling). As seen in FIG. 11B, the battery cell including the separator of Comparative Example 1 demonstrated a slightly higher overpotential and lower capacity in comparison to the battery cell including the separator of Example 2 and the battery cell including the separator of Example 3. This may be attributed to a reaction of diffusing oxygen gas with sodium metal in the presence of the electrolyte at the anode of the battery cell. The battery cells including the reinforced separators may have reduced migration of oxidation products and/or cathode materials through the separator, which may reduce reactions of diffusing oxygen gas with the sodium metal in the presence of the electrolyte. FIG. 11B also shows that a separator including a plurality of inorganic particles that are ionically conductive (Example 3) may exhibit improved electrochemical performance in comparison to a separator including a plurality of inorganic particles that are ionically non-conductive (Example 2).

Figure 11C:
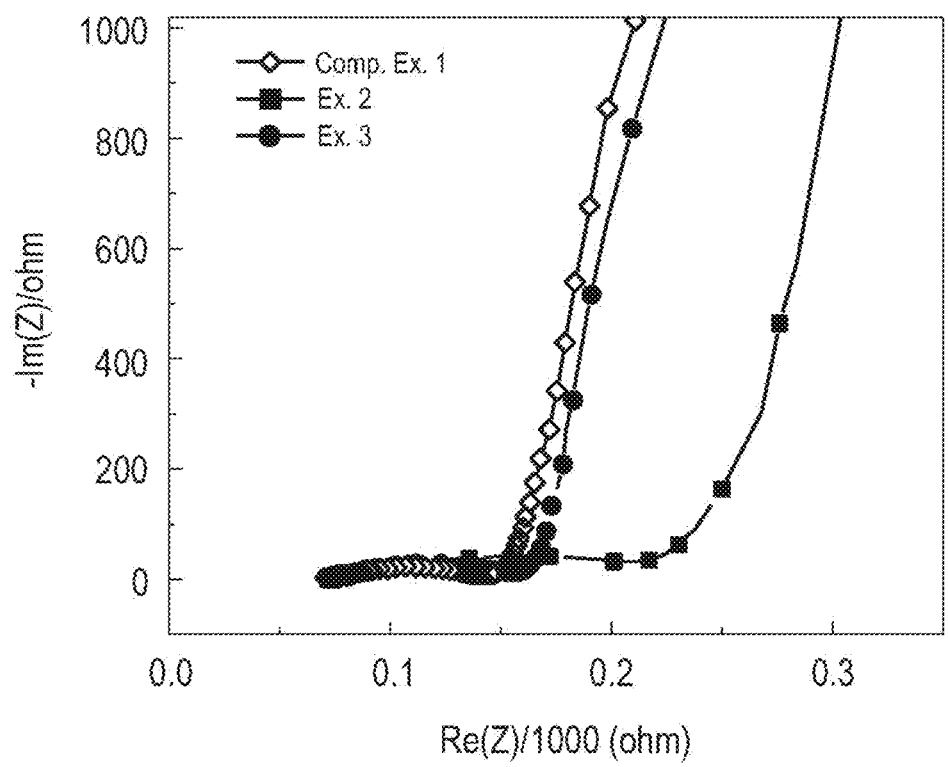
FIG. 11C is a comparative graph illustrating Nyquist plots after oxygenation at an open circuit voltage (OCV) of a battery cell including the separator of Example 2, a battery cell including the separator of Example 3, and a battery cell including the separator of Comparative Example 1 (with a layer of Celgard 2500).

FIG. 11C is a comparative graph illustrating Nyquist plots after oxygenation at an open circuit voltage (OCV) of the battery cell including the separator of Example 2, the battery cell including the separator of Example 3, and the battery cell including the separator of Comparative Example 1 (with the layer of Celgard 2500). As seen in FIG. 11C, all of the graphs exhibit semicircle shapes at first, which may correspond to the interfacial resistance between the electrolyte and the electrodes. The semicircle shapes are each followed by a Warburg linear region, which may be related to the sodium-ion migration resistance at the cathode material. The battery cell including the separator of Comparative Example 1 and the battery cell including the separator of Example 3 demonstrated a lower impedance than the battery cell including the separator of Example 2. This may be due to a higher conduction pathway in the battery cell including the separator of Example 2 from the ionically non-conductive nature of the inorganic particles of Example 2.

Figure 11D:
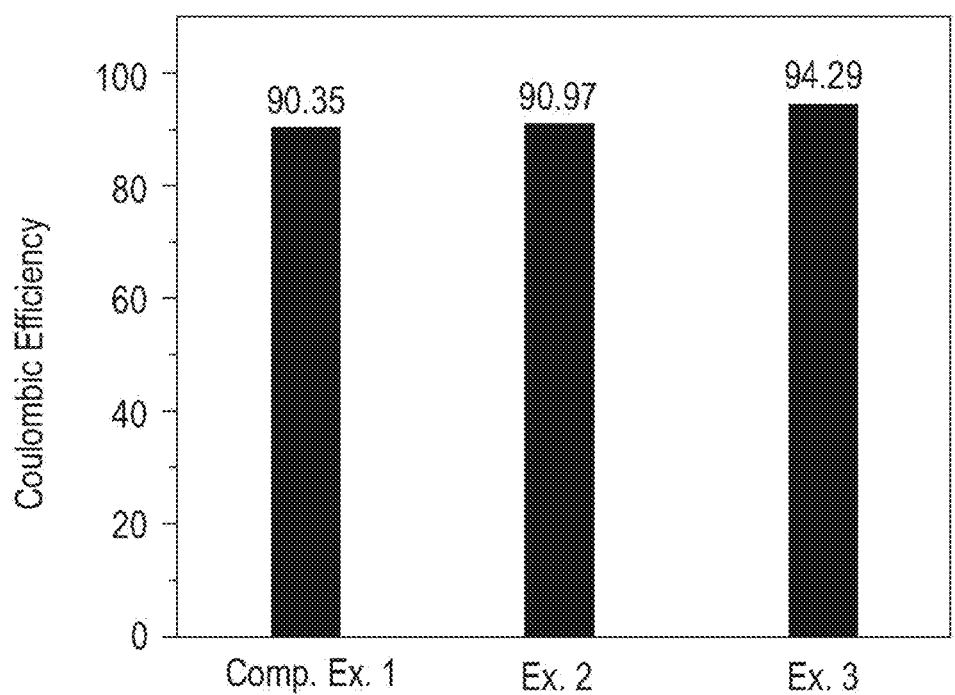
FIG. 11D is a comparative graph illustrating coulombic efficiencies of the first cycles of a battery cell including the separator of Example 2, a battery cell including the separator of Example 3, and a battery cell including the separator of Comparative Example 1 (with a layer of Celgard 2500).

FIG. 11D is a comparative graph illustrating coulombic efficiencies of the first cycles of the battery cell including the separator of Example 2, the battery cell including the separator of Example 3, and the battery cell including the separator of Comparative Example 1 (with the layer of Celgard 2500). As seen in FIG. 11D, the battery cell including the separator of Example 3 demonstrated a higher coulombic efficiency in comparison to both the battery cell including the separator of Comparative Example 1 and the battery cell including the separator of Example 2. This may be due to a higher stability of the discharge product due to the higher ionic conductivity (e.g., due to the ionically conductive inorganic particles) and the lower overpotential of the battery cell in comparison to the battery cells including the separators of Comparative Example 1 and Example 2.

Example 4

Li—Cu Battery Cell Fabrication

A 2032 coin cell including a lithium metallic anode with a thickness of about 250 $\mu$m, a separator, and Cu foil with a thickness of about 25 $\mu$m as the cathode material was assembled in an argon filled glove box. LiPF$_6$ in EC/DMC was used as an electrolyte and the current density applied was 0.5 mA/cm$^2$.

Example 5

Separator Including Micropatterned Epoxy-Based Membrane Reinforced by $\beta$-Alumina Particles A micropatterned epoxy-based membrane (available from Precision Membranes LLC of Provo, Utah) including two layers, each with a distinct void pattern was used as the membrane of the separator. The first layer was 10 $\mu$m thick with 6 $\mu$m in diameter round voids and the second layer was 90 $\mu$m thick with large square channels (e.g., voids) that extended through the thickness of the second layer (e.g., from an outer surface of the membrane to the first layer). Each square channel had dimensions of 100 $\mu$m by 100 $\mu$m by 90 $\mu$m. The first layer of the membrane was secured on a piece of glass plate using double-sided tape and the second layer of the membrane was exposed to air. Inorganic $\beta$-alumina particles were used to fill the channels of the second layer by sprinkling the particles on the membrane (e.g., into the exposed channels) followed by wiping gently with Kim-wipes to remove any excess particles on the outer surface of the membrane. The $\beta$-alumina particles were ionically non-conductive. The separator including the epoxy-based membrane and the $\beta$-alumina particles was then released from the glass plate and wiped with an electrolyte solvent to remove any residual adhesive from the double-sided tape on the first layer.

Figure 12:
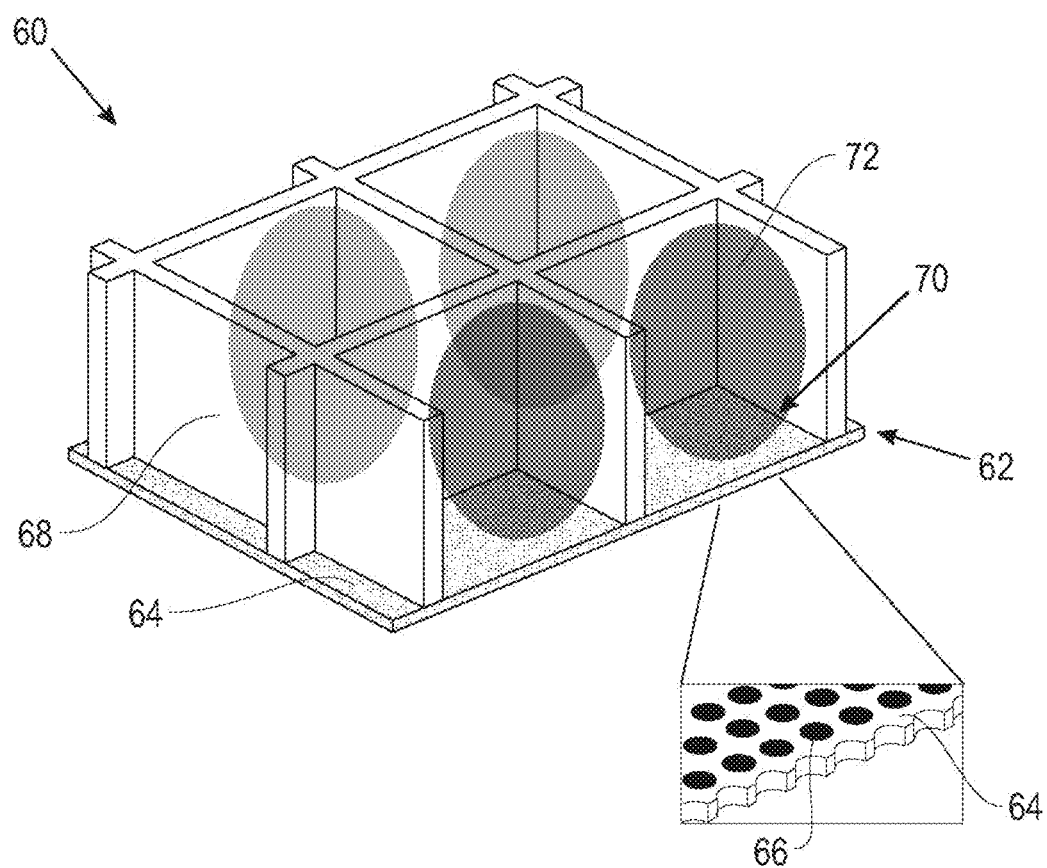
FIG. 12 is a schematic diagram illustrating an example separator including a micropatterned epoxy-based membrane reinforced by β-alumina particles.

FIG. 12 is a schematic diagram illustrating an example separator 60 including the micropatterned epoxy-based membrane 62 reinforced by the $\beta$-alumina particles 72. Separator 60 includes the first layer 64 including a first plurality of voids 66 (e.g., the plurality of round voids) and the second layer 68 including a second plurality of voids 70 (e.g., the plurality of square channels). The second plurality of voids 70 includes the plurality of $\beta$-alumina particles 72 within the voids 70. FIG. 12 illustrates separator 60 including one inorganic $\beta$-alumina particle 72 within each void 70 of the second layer 68 of membrane 62.

Figure 13A:
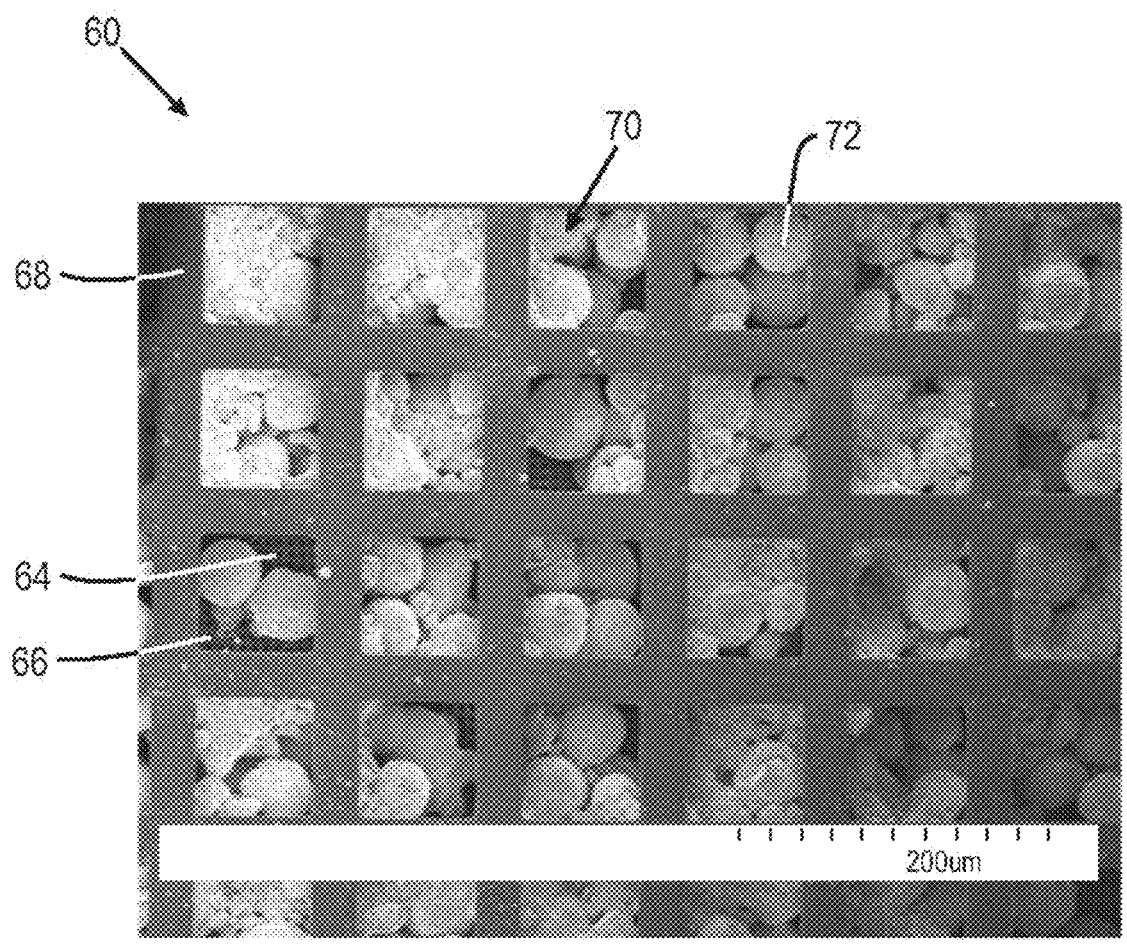
FIG. 13A is a SEM image of a top view of a separator including a micropatterned epoxy-based membrane reinforced by β-alumina particles.
Figure 13B:
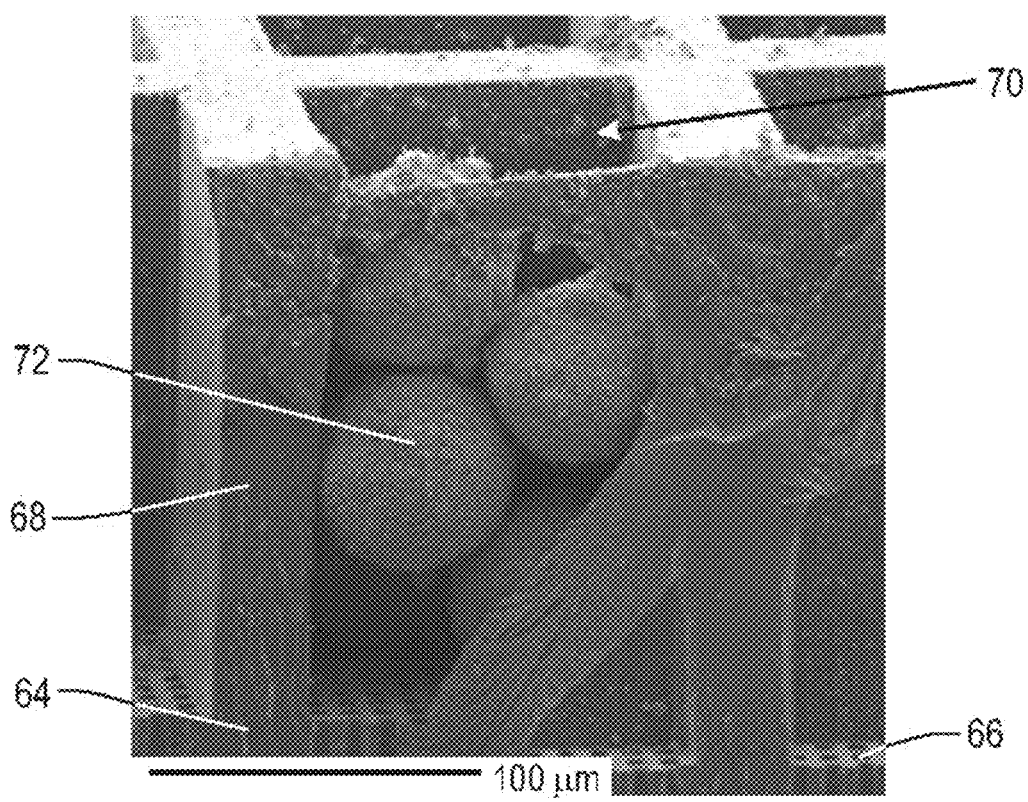
FIG. 13B is a SEM image of a cross-sectional view of a separator including a micropatterned epoxy-based membrane reinforced by β-alumina particles.

FIG. 13A is a SEM image of a top view of separator 60 including the micropatterned epoxy-based membrane 62 reinforced by the $\beta$-alumina particles 72. FIG. 13B is a SEM image of a cross-sectional view of separator 60 including the micropatterned epoxy-based membrane 62 reinforced by the $\beta$-alumina particles 72. FIGS. 13A and 13B illustrate separator 60 including a plurality of inorganic $\beta$-alumina particles 72 within each void 70 of the second layer 68 of membrane 62.

A Li—Cu battery cell was fabricated according the method of Example 4 with the separator including the micropatterned epoxy-based membrane reinforced by the $\beta$-alumina particles.

Figure 14:
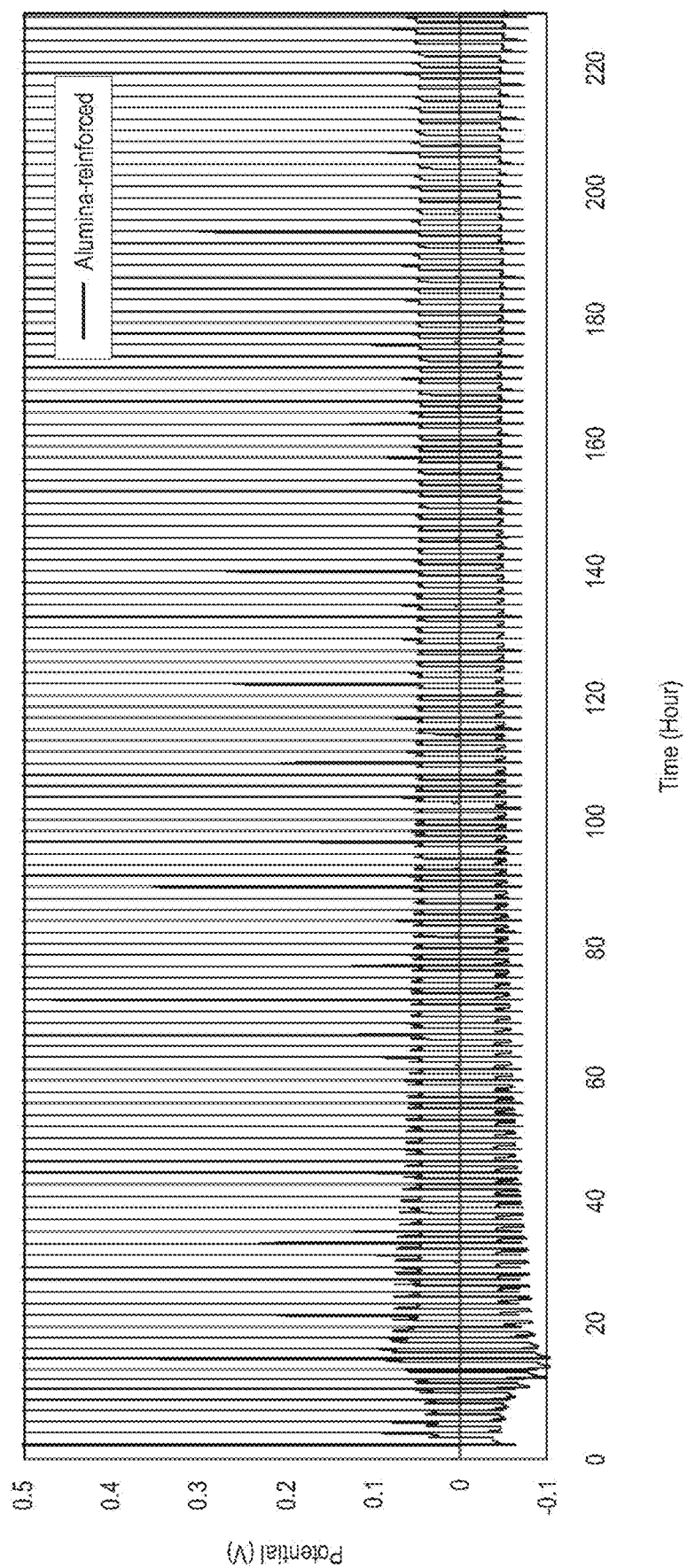
FIG. 14 is a graph illustrating a voltage profile of a Li—Cu battery cell including a micropatterned epoxy-based membrane reinforced by β-alumina particles during plating and stripping of Li under a current density of about 0.5 mA $cm^{-2}$.

FIG. 14 is a graph illustrating a voltage profile of the Li—Cu battery cell including the micropatterned epoxy-based membrane reinforced by the β-alumina particles during plating and stripping of Li under a current density of about 0.5 mA cm$^{-2}$. As seen in FIG. 14, the Li—Cu battery cell including the micropatterned epoxy-based membrane reinforced by the β-alumina particles was able to undergo metal plating and stripping for about 230 hours (about 133 cycles) with no sign of dendrite formation (e.g., no sign of an internal short circuit).

Example 6

Separator Including Micropatterned Epoxy-Based Membrane Reinforced by LLZO Particles A separator including a micropatterned epoxy-based membrane reinforced by LLZO particles was formed using a technique similar to that of Example 5. The LLZO particles were ionically conductive with respect to lithium ions. A Li—Cu battery cell was fabricated according the method of Example 4 with the separator including the micropatterned epoxy-based membrane reinforced by the LLZO particles.

Figure 15:
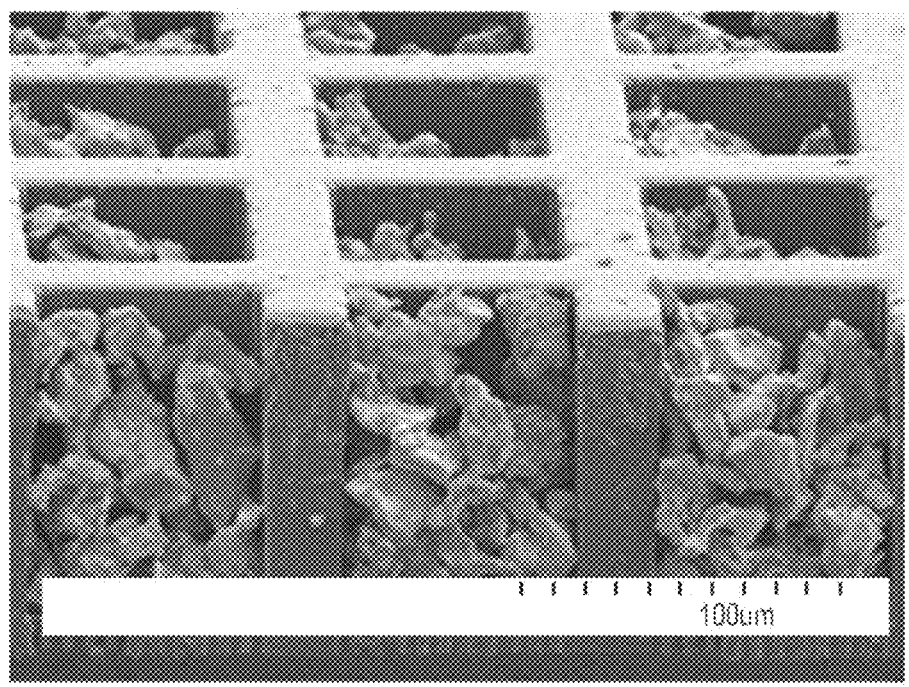
FIG. 15 is a SEM image of a cross-sectional view of a separator including a micropatterned epoxy-based membrane reinforced by $Li_7La_3Zr_2O_{12}$ (LLZO) particles.

FIG. 15 is a SEM image of a cross-sectional view of the separator including the micropatterned epoxy-based membrane reinforced by the LLZO particles.

Figure 16:
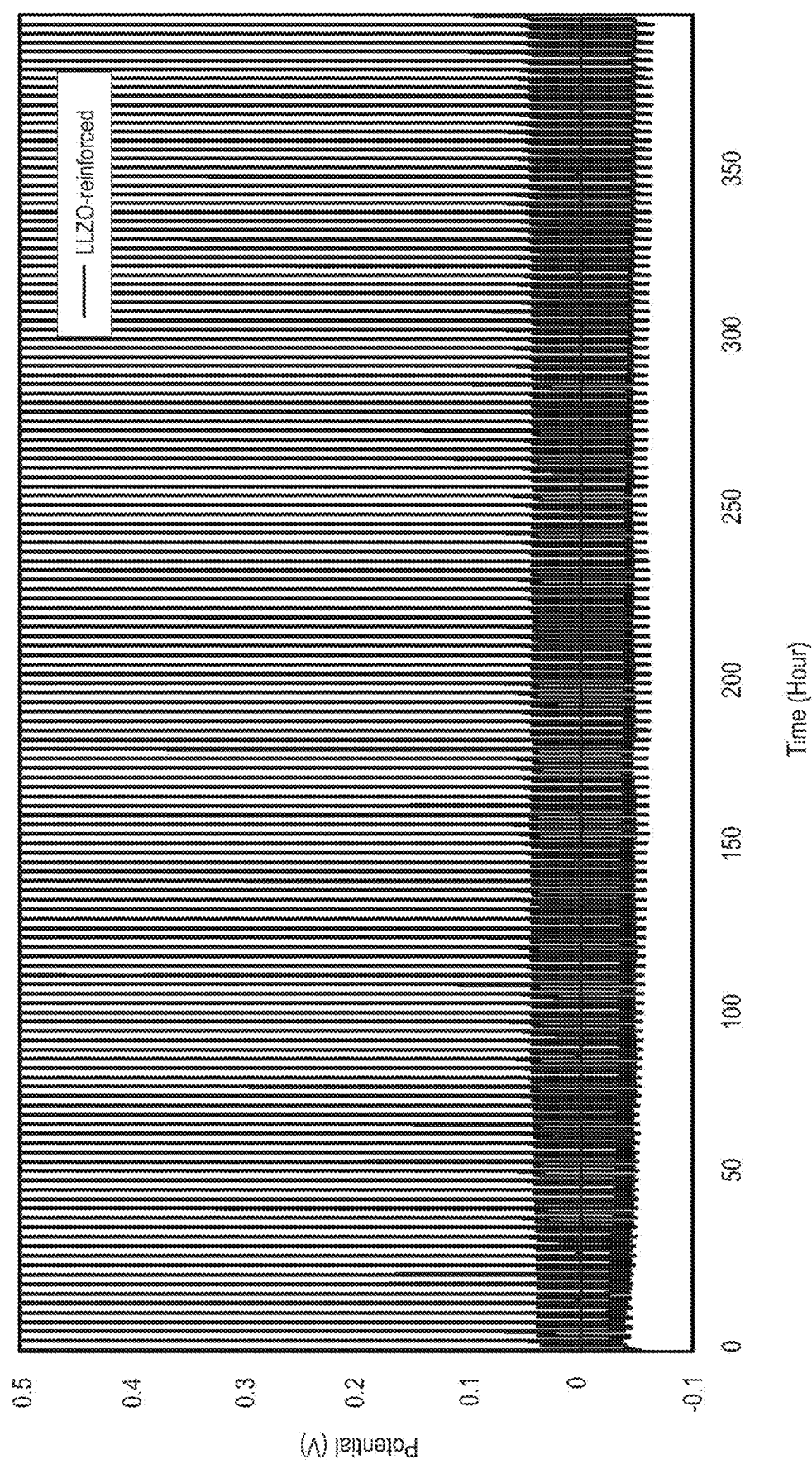
FIG. 16 is a graph illustrating a voltage profile of a Li—Cu battery cell including a micropatterned epoxy-based membrane reinforced by $Li_7La_3Zr_2O_{12}$ (LLZO) particles during plating and stripping of Li under a current density of about 0.5 mA $cm^{-2}$.

FIG. 16 is a graph illustrating a voltage profile of the Li—Cu battery cell including the micropatterned epoxy-based membrane reinforced by the LLZO particles during plating and stripping of Li under a current density of about 0.5 mA cm$^{-2}$. As seen in FIG. 16, the Li—Cu battery cell including the micropatterned epoxy-based membrane reinforced by the LLZO particles was able to undergo metal plating and stripping for about 400 hours (about 224 cycles) with no sign of dendrite formation (e.g., no sign of an internal short circuit). Similar to the Na—O$_2$ battery cells described above, the inorganic LLZO particles that were ionically conductive had improved cycling performance in comparison to the inorganic particles that were ionically non-conductive.

Comparative Example 2

Separator Including Micropatterned Epoxy-Based Membrane (Non-Reinforced)

A Li—Cu battery cell was fabricated according the method of Example 4 with a separator including a micropatterned epoxy-based membrane. The separator did not include any inorganic particles as described herein, and thus was not reinforced.

Figure 17:
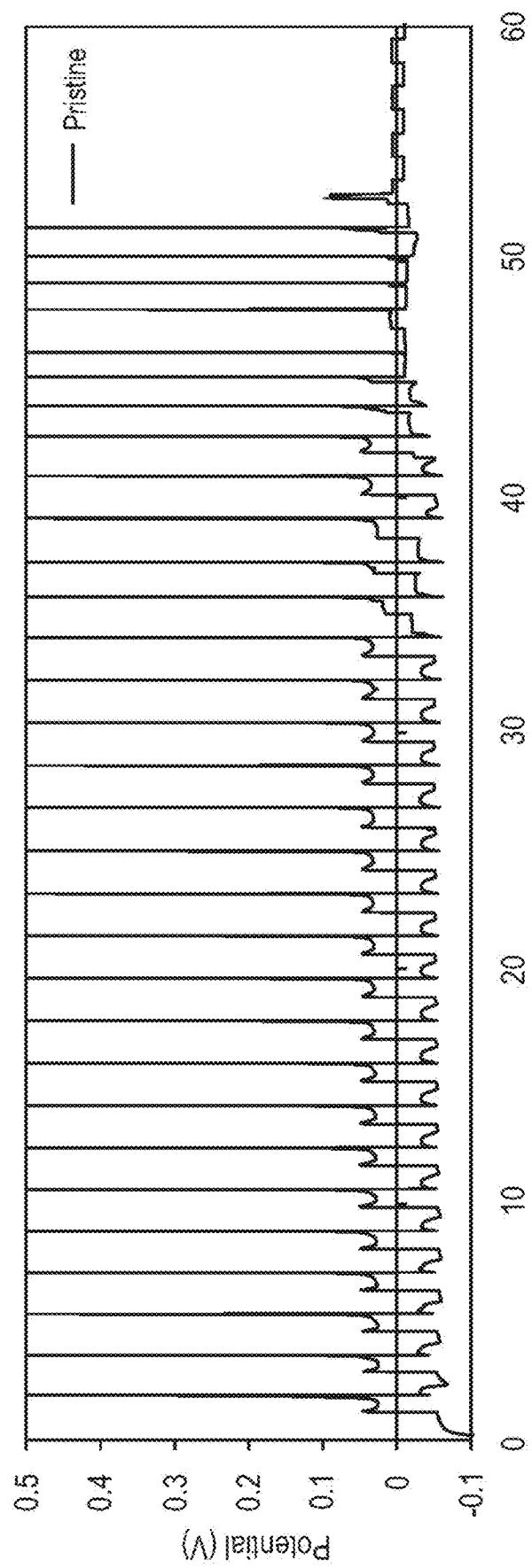
FIG. 17 is a graph illustrating a voltage profile of a Li—Cu battery cell including a non-reinforced micropatterned epoxy-based membrane during plating and stripping of Li under a current density of about 0.5 mA $cm^{-2}$.

FIG. 17 is a graph illustrating a voltage profile of the Li—Cu battery cell including the non-reinforced micropatterned epoxy-based membrane during plating and stripping of Li under a current density of about 0.5 mA cm$^{-2}$. As seen in FIG. 17, the Li—Cu battery cell including the non-reinforced micropatterned epoxy-based membrane exhibited signs of an internal short circuit after about 47 hours of metal stripping and plating, with a complete internal short circuit occurring after about 52 hours. As described above, the reinforced separators of Examples 5 and 6 were able to sustain 230 hours and 400 hours of cycling, respectively, without any signs of internal short circuits and/or dendrite formation.

Figure 18:
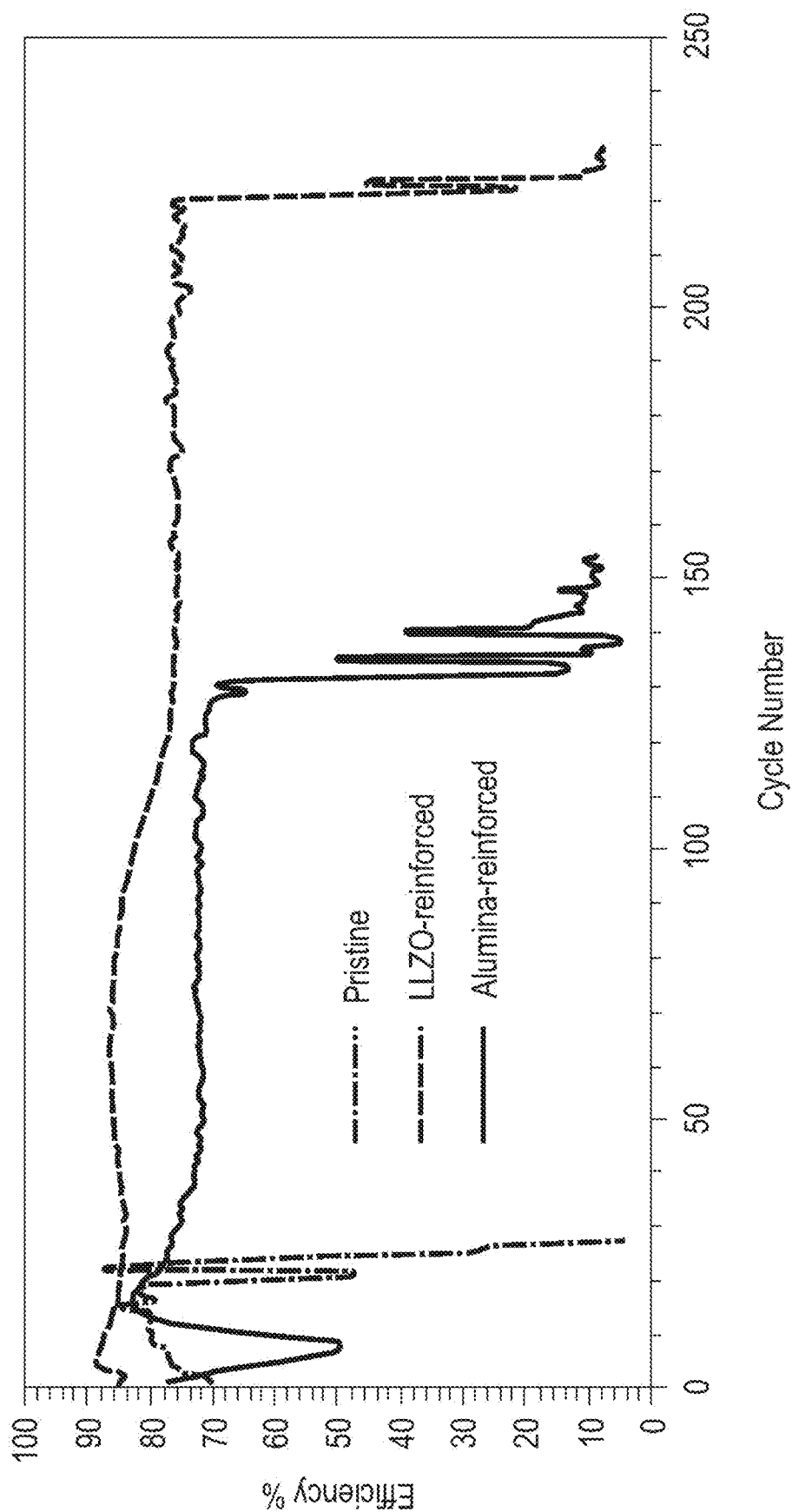
FIG. 18 is a comparative graph illustrating cycling efficiencies of a battery cell including the separator of Example 5, a battery cell including the separator of Example 6, and a battery cell including the separator of Comparative Example 2.

FIG. 18 is a comparative graph illustrating cycling efficiencies of the battery cell including the separator of Example 5, the battery cell including the separator of Example 6, and the battery cell including the separator of Comparative Example 2. The cycling efficiency was obtained under one-hour discharge (in which Li was deposited on the surface of the Cu cathode material), followed by one-hour charge with a voltage limit of about 0.5 V (in which the deposited Li was transferred back to the Li metallic anode). The current density was set at 0.5 mA/(cm$^2$ of Cu). The cyclic efficiency of each battery cell was calculated by dividing the stripping capacity by the plating capacity for each cycle.

As seen in FIG. 18, the cyclic efficiency of the battery cell including the non-reinforced separator of Comparative Example 2 was reduced to less than about 10% after about 45 hours (e.g., about 27 cycles), which was much earlier than both of the battery cells including the separators of Examples 5 and 6. For example, the battery cell including the separator of Examples 5 demonstrated stable stripping and plating behaviors with about 70% and 80% cyclic efficiency for about 130 cycles, and the battery cell including the separator of Example 6 demonstrated stable stripping and plating behaviors with about 80% cyclic efficiency for about 220 cycles. Moreover, the battery cell including the separator of Example 6 including ionically conductive inorganic particles maintained a higher cyclic efficiency over a larger number of cycles in comparison to both the battery cell including the non-reinforced separator of Comparative Example 2 and the battery cell including the separator of Example 5 including ionically non-conductive inorganic particles. The higher cyclic efficiency of the battery cell including the separator of Example 6 may be due to the ionic conductivity of the inorganic particles within at least some voids of the plurality of voids of the membrane.

Various examples have been described. These and other examples are within the scope of the following claims.

What is claimed is:

1. An energy storage device, comprising:
an anode;
a cathode;
an electrolyte in physical contact with both the anode and the cathode; and
an electrically non-conductive separator between the anode and the cathode, the separator comprising a membrane with a first layer and a second layer, the first layer comprising a first plurality of voids with a first average characteristic dimension, and the second layer comprising a second plurality of voids with a second average characteristic dimension different than the first average characteristic dimension, the first plurality of voids defining a first pattern of voids in the first layer, and the second plurality of voids defining a second pattern of voids in the second layer, wherein at least some of the first plurality and/or the second plurality of voids are partially filled with inorganic particles, wherein the inorganic particles exhibit a shear modulus greater than the shear modulus of the membrane and produce a cycling efficiency for the energy storage device of at least 70% for at least 130 cycles.

2. The energy storage device of claim 1, wherein at least a plurality of the voids has an average characteristic dimension of between about 1 nanometer and about 100 microns.

3. The energy storage device of claim 1, wherein the inorganic particles have a shear modulus of greater than about 1 GPa.

4. The energy storage device of claim 1, wherein the inorganic particles are selected from the group consisting of silica, alumina, a zeolite, a metal, a metal oxide, and combinations thereof.

5. The energy storage device of claim 1, wherein the inorganic particles are ion-conducting.

6. The energy storage device of claim 1, wherein the voids are substantially uniform in size and shape.

7. The energy storage device of claim 1, wherein the separator further comprises a polymeric binder in contact with the inorganic particles.

8. The energy storage device of claim 7, wherein the polymeric binder comprises an electrochemically stable material selected from the group consisting of carboxymethyl cellulose (CMC), styrene butadiene rubber (SBR), polyvinylidene fluoride (PVDF), polytetrafluoroethylene (PTFE), polyethylene glycol (PEG), polyethylene oxide (PEO), sodium alginate, polyvinylpyrrolidone (PVP), polyvinyl alcohol (PVA), and combinations thereof.

9. The energy storage device of claim 1, wherein the membrane is selected from the group consisting of a polymer, an inorganic material, an organic-inorganic hybrid material, and combinations thereof.

10. An energy storage device, comprising:
an anode;
a cathode;
an electrolyte in physical contact with both the anode and the cathode; and
an electrically non-conductive separator between the anode and the cathode, the separator comprising a membrane with a first layer and a second layer, the first layer comprising a first plurality of voids with a first average characteristic dimension, the second layer comprising a second plurality of voids with a second average characteristic dimension different than the first average characteristic dimension, the first plurality of voids defining a first pattern of voids in the first layer, and the second plurality of voids defining a second pattern of voids in the second layer, wherein at least 50% of the total volume of the first plurality and the second plurality of voids is filled with inorganic particles, wherein the inorganic particles prevent dendrite penetration through the separator by reinforcing the membrane and produce a cycling efficiency for the energy storage device of at least 70% for at least 130 cycles.

11. The energy storage device of claim 10, wherein at least a plurality of the voids has an average characteristic dimension between about 1 nanometer and about 100 microns.

12. The energy storage device of claim 10, wherein the anode is selected from the group consisting of lithium, sodium, magnesium, and combinations thereof, and wherein the inorganic particles have a shear modulus greater than the shear modulus of the anode.

13. The energy storage device of claim 10, wherein the inorganic particles have a shear modulus greater than the shear modulus of the membrane.

14. The energy storage device of claim 10, wherein the inorganic particles are selected from the group consisting of silica, alumina, a zeolite, a metal, a metal oxide, and combinations thereof.

15. The energy storage device of claim 10, wherein the inorganic particles are ion-conducting inorganic particles.

16. The energy storage device of claim 10, wherein the separator comprises a polymeric binder selected from the group consisting of carboxymethyl cellulose (CMC), styrene butadiene rubber (SBR), polyvinylidene fluoride (PVDF), polytetrafluoroethylene (PTFE), polyethylene glycol (PEG), polyethylene oxide (PEO), sodium alginate, polyvinylpyrrolidone (PVP), polyvinyl alcohol (PVA), and combinations thereof.

17. The energy storage device of claim 10, wherein the membrane is selected from the group consisting of a polymer, an inorganic material, an organic-inorganic hybrid material, and combinations thereof.

18. The energy storage device of claim 10, wherein the energy storage device interfaces with an oxygen source.

19. A method of forming an energy storage device, comprising:
depositing inorganic particles within voids of an electrically non-conductive membrane, wherein the membrane comprises a first layer and a second layer, the first layer comprising a first plurality of voids with a first average characteristic dimension, the second layer comprising a second plurality of voids with a second average characteristic dimension different than the first average characteristic dimension, the first plurality of voids defining a first pattern of voids in the first layer, and the second plurality of voids defining a second pattern of voids in the second layer, wherein at least 50% of the total volume of the first plurality and the second plurality of voids is filled with inorganic particles, wherein the inorganic particles have a shear modulus greater than the shear modulus of the membrane and produce a cycling efficiency for the energy storage device of at least 70% for at least 130 cycles;
placing the membrane between an anode and a cathode; and
adding an electrolyte between the anode and the cathode, thereby forming the energy storage device, wherein the electrolyte is in physical contact with both the anode and the cathode.

20. The energy storage device of claim 1, wherein the inorganic particles reinforce the membrane and the reinforcement of the membrane prevents dendrite penetration through the separator.

21. The energy storage device of claim 1, wherein the inorganic particles decrease the size of each void thereby reducing formation of dendrites on the anode and/or the cathode.

22. The energy storage device of claim 1, wherein the inorganic particles prevent migration of oxidation products and/or cathode materials through the separator.

* * * * *